United States Patent
Lian

(10) Patent No.: US 12,346,709 B2
(45) Date of Patent: Jul. 1, 2025

(54) METHOD AND APPARATUS FOR RUNNING APPLICATION PROGRAM, ELECTRONIC DEVICE, AND STORAGE MEDIUM

(71) Applicant: VIVO MOBILE COMMUNICATION CO., LTD., Dongguan (CN)

(72) Inventor: Sixia Lian, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/227,882

(22) Filed: Jul. 28, 2023

(65) Prior Publication Data
US 2023/0376321 A1   Nov. 23, 2023

Related U.S. Application Data

(63) Continuation of application No. PCT/CN2022/074642, filed on Jan. 28, 2022.

(30) Foreign Application Priority Data

Jan. 28, 2021 (CN) .......................... 202110118177.1

(51) Int. Cl.
*G06F 9/451* (2018.01)
*G06F 3/04817* (2022.01)
(Continued)

(52) U.S. Cl.
CPC .......... *G06F 9/451* (2018.02); *G06F 3/04817* (2013.01); *G06F 3/0482* (2013.01);
(Continued)

(58) Field of Classification Search
CPC .. G06F 9/451; G06F 3/04817; G06F 3/04845; G06F 3/0488; G06F 3/0482;
(Continued)

(56) References Cited

U.S. PATENT DOCUMENTS

2013/0205304 A1* 8/2013 Jeon ...................... G06F 3/0486
                                                     718/107
2013/0227419 A1* 8/2013 Lee ........................... G06F 9/48
                                                      715/728
(Continued)

FOREIGN PATENT DOCUMENTS

CN        106919335 A        7/2017
CN        107229472 A       10/2017
(Continued)

OTHER PUBLICATIONS

International Search Report issued in corresponding International Application No. PCT/CN2022/074642, mailed Mar. 25, 2022, 5 pages.
(Continued)

*Primary Examiner* — Irete F Ehichioya
*Assistant Examiner* — Jianmei F Duckworth
(74) *Attorney, Agent, or Firm* — IPX PLLC

(57) ABSTRACT

A method and apparatus for running an application program, an electronic device, and a storage medium are provided. The method includes: receiving a first input by a user; in response to the first input, displaying a first target control; receiving a second input by the user into a first application program that runs in the foreground; in response to the second input, displaying a thumbnail of a first interface of the first application program; receiving a third input by the user into the thumbnail of the first interface of the first application program; and in response to the third input, switching the first application program to run in the background and displaying an identifier of the first application program in the first target control.

12 Claims, 22 Drawing Sheets

(51) Int. Cl.
  *G06F 3/0482* (2013.01)
  *G06F 3/04845* (2022.01)
  *G06F 3/0486* (2013.01)
  *G06F 3/04847* (2022.01)
  *G06F 3/0485* (2022.01)
  *G06F 3/0488* (2022.01)
  *G06F 3/04883* (2022.01)

(52) U.S. Cl.
  CPC ........ *G06F 3/04845* (2013.01); *G06F 3/0486* (2013.01); *G06F 3/04847* (2013.01); *G06F 3/0485* (2013.01); *G06F 3/0488* (2013.01); *G06F 3/04883* (2013.01)

(58) Field of Classification Search
  CPC .. G06F 3/0485; G06F 3/0486; G06F 3/04883; G06F 3/04847; H04W 4/80
  See application file for complete search history.

(56) References Cited

U.S. PATENT DOCUMENTS

| | | | |
|---|---|---|---|
| 2014/0181725 A1* | 6/2014 | Yang | G06F 3/0481 715/777 |
| 2015/0365306 A1* | 12/2015 | Chaudhri | H04N 21/47205 715/753 |
| 2016/0062635 A1 | 3/2016 | Feit et al. | |
| 2018/0329550 A1* | 11/2018 | Dellinger | G06F 9/542 |
| 2020/0057555 A1* | 2/2020 | Walkin | G06F 3/0483 |
| 2020/0142548 A1* | 5/2020 | Karunamuni | G06F 3/0486 |
| 2020/0162576 A1* | 5/2020 | Yellin | H04N 21/84 |
| 2021/0048939 A1* | 2/2021 | Song | G06F 9/451 |
| 2022/0050582 A1* | 2/2022 | Zhou | G06F 3/0485 |
| 2023/0097982 A1* | 3/2023 | Kim | G06V 40/1306 455/575.4 |
| 2023/0168784 A1* | 6/2023 | Zhang | G06F 3/0481 715/781 |

FOREIGN PATENT DOCUMENTS

| | | |
|---|---|---|
| CN | 108427526 A | 8/2018 |
| CN | 108491129 A | 9/2018 |
| CN | 110007996 A | 7/2019 |
| CN | 110515717 A | 11/2019 |
| CN | 110990092 A | 4/2020 |
| CN | 111371949 A | 7/2020 |
| CN | 112083854 A | 12/2020 |
| CN | 112783391 A | 5/2021 |
| EP | 3726356 A1 | 10/2020 |
| EP | 3779684 A1 | 2/2021 |
| WO | 2019233306 A1 | 12/2019 |

OTHER PUBLICATIONS

First Office Action issued in related Chinese Application No. 202110118177.1, mailed Jan. 4, 2022, 5 pages.

Extended European Search Report issued in related European Application No. 22745338.8, mailed May 8, 2024, 8 pages.

* cited by examiner

METHOD AND APPARATUS FOR RUNNING APPLICATION PROGRAM, ELECTRONIC DEVICE, AND STORAGE MEDIUM

CROSS-REFERENCE TO RELATED APPLICATIONS

This application is a continuation of International Application No. PCT/CN2022/074642, filed Jan. 28, 2022, which claims priority to Chinese Patent Application No. 202110118177.1, filed Jan. 28, 2021. The entire contents of each of the above-referenced applications are expressly incorporated herein by reference.

TECHNICAL FIELD

This application relates to the field of information processing technologies, and in particular, to a method and apparatus for running an application program, an electronic device, and a storage medium.

BACKGROUND

On an operating system of a smart mobile terminal, usually, a plurality of application programs are allowed to run simultaneously. An application program that is currently in use is referred to as a foreground application program, and an application program that has already loaded a resource but is not in use is referred to as a background application program. Although the background application program is not an application program that is currently used by a user, the user can implement a series of operations such as opening, closing, or switching the background application program by performing specific operations.

In the prior art, when the user needs to switch an application program from the foreground to the background, the user needs to temporarily leave a current interface of the smart mobile terminal. This is relatively cumbersome, and it takes longer for the application program to response.

SUMMARY

Embodiments of this application are intended to provide a method and apparatus for running an application program, an electronic device, and a storage medium.

According to a first aspect, an embodiment of this application provides a method for running an application program, and the method includes:
  receiving a first input by a user;
  in response to the first input, displaying a first target control, where the first target control contains an identifier of an application program that runs in the background;
  receiving a second input by the user into a first application program that runs in the foreground;
  in response to the second input, displaying a thumbnail of a first interface of the first application program, where the first interface of the first application program is an interface when the first application program runs in the foreground;
  receiving a third input by the user into the thumbnail of the first interface of the first application program; and
  in response to the third input, switching the first application program to run in the background and displaying an identifier of the first application program in the first target control.

According to a second aspect, an embodiment of this application provides an apparatus for running an application program, including:
  a first input receiving module, configured to receive a first input by a user;
  a first target control display module, configured to, in response to the first input, display a first target control, where the first target control contains an identifier of an application program that runs in the background;
  a second input receiving module, configured to receive a second input by the user into a first application program that runs in the foreground;
  a first interface thumbnail display module, configured to, in response to the second input, display a thumbnail of a first interface of the first application program, where the first interface of the first application program is an interface when the first application program runs in the foreground;
  a third input receiving module, configured to receive a third input by the user into the thumbnail of the first interface of the first application program; and
  a background running switching module, configured to, in response to the third input, switch the first application program to run in the background and display an identifier of the first application program in the first target control.

According to a third aspect, an embodiment of this application provides an electronic device, where the electronic device includes a processor, a memory, and a program or an instruction stored in the memory and capable of running on the processor, and when the program or the instruction is executed by the processor, steps of the method according to the first aspect are implemented.

According to a fourth aspect, an embodiment of this application provides a readable storage medium, where the readable storage medium stores a program or an instruction, and when the program or the instruction is executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or an instruction, to implement the method according to the first aspect.

In the embodiments of this application, a first input by a user is received; in response to the first input, a first target control is displayed; a second input by the user into a first application program that runs in the foreground is received; in response to the second input, a thumbnail of a first interface of the first application program is displayed; a third input by the user into the thumbnail of the first interface of the first application program is received; and in response to the third input, the first application program is switched to run in the background and an identifier of the first application program in the first target control is displayed. In this method, quick switching the application program from running in the foreground to running in the background can be implemented, so that the application program is easier to operate and manage.

DETAILED DESCRIPTION

The following describes the technical solutions in embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and a character "/" generally represents an "or" relationship between associated objects.

The following describes in detail the method and apparatus for running an application program, the electronic device, and the storage medium provided in the embodiments of this application through specific embodiments and application scenarios thereof with reference to the accompanying drawings.

Figure 1:
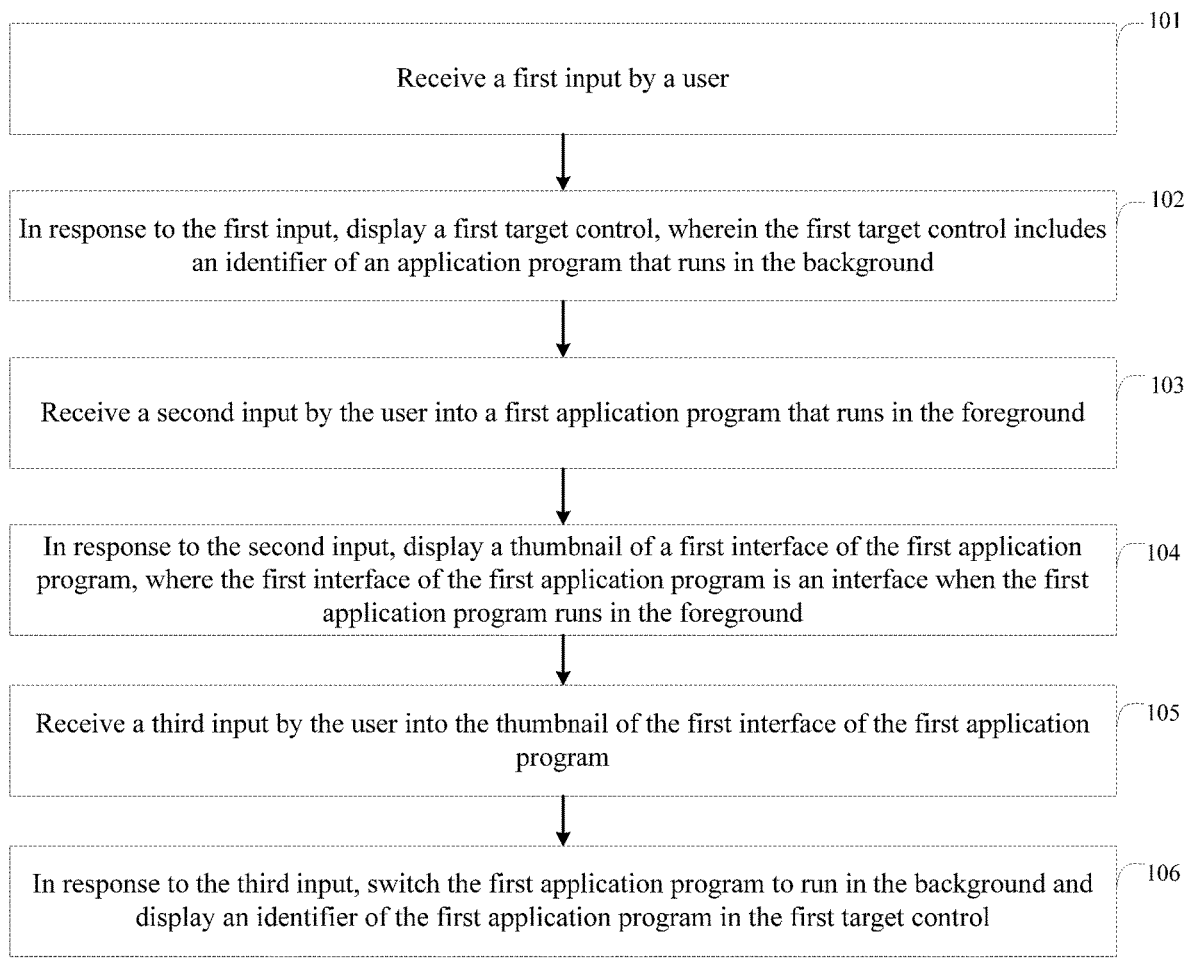
FIG. 1 is a flowchart of a method for running an application program according to an embodiment of this application.

FIG. 1 is a flowchart of a method for running an application program according to an embodiment of this application. As shown in FIG. 1, the method for running an application program provided in the embodiments of this application is applied to an electronic device, and the method includes:

step 101: Receive second input of the user;

step 102: In response to the first input, display a first target control, where the first target control contains an identifier of an application program that runs in the background;

step 103: Receive a second input by the user into a first application program that runs in the foreground;

step 104: In response to the second input, display a thumbnail of a first interface of the first application program, where the first interface of the first application program is an interface when the first application program runs in the foreground;

step 105: Receive a third input by the user into the thumbnail of the first interface of the first application program; and step 106: In response to the third input, switch the first application program to run in the background and display an identifier of the first application program in the first target control.

In some embodiments of this application, the electronic device may be a mobile phone, a tablet computer, a notebook computer, a palmtop computer, a vehicle-mounted terminal, a wearable device, an Ultra-Mobile Personal Computer (UMPC), a netbook, a Personal Digital Assistant (PDA), or the like. This is not specifically limited in the embodiments of this application.

Usually, a plurality of application programs can run in an electronic device simultaneously. In the embodiments of this application, the application program that runs in the foreground is referred to as a foreground application program, and the application program that runs in the background is referred to as a background application program.

When the application program runs in the foreground, a current interface displayed on a display screen of the electronic device is an interface of the foreground application program. In the prior art, if an operation needs to be performed on a background application program, a user can exit an interface of a foreground application program by performing specific operations so that the application program that runs in the background is displayed. For example, by swiping upward from a bottom or touching and holding a home button, the user exits the interface of the foreground application program, and then the application program that runs in the background is displayed in a split-screen display manner.

In the embodiments of this application, in a case that a display screen of an electronic device displays the interface of the foreground application program, a first input by a user is received, and then, in response to the first input, a first target control is displayed.

Figure 2:
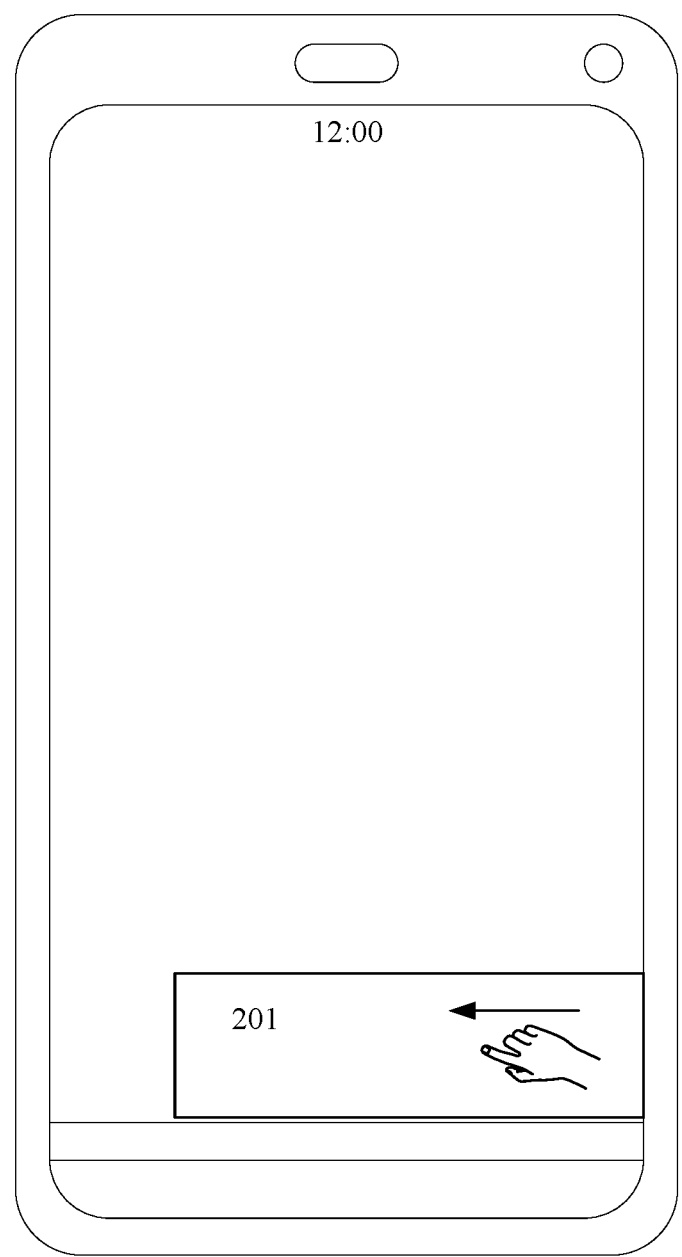
FIG. 2 is a first schematic diagram of an interface according to an embodiment of this application.

In some implementations, the first input by the user is a swiping operation on the display screen of the electronic device. The swiping operation occurs in a specific area on the display screen. FIG. 2 is a first schematic diagram of an interface according to an embodiment of this application. As shown in FIG. 2, an area 201 is set at the bottom right edge of the display screen of the electronic device, and the user's swiping operation within the area 201 is identified as the first input by the user.

The first target control is used to display the identifier of the application program that is currently running in the background. In the embodiments of this application, the first target control is a half disk, and the identifier of the application program that runs in the background is distributed on the half disk. The identifier of the application program may be an icon of the application program, a name of the application program, or another iconic symbol that can represent the application program.

Figure 3:
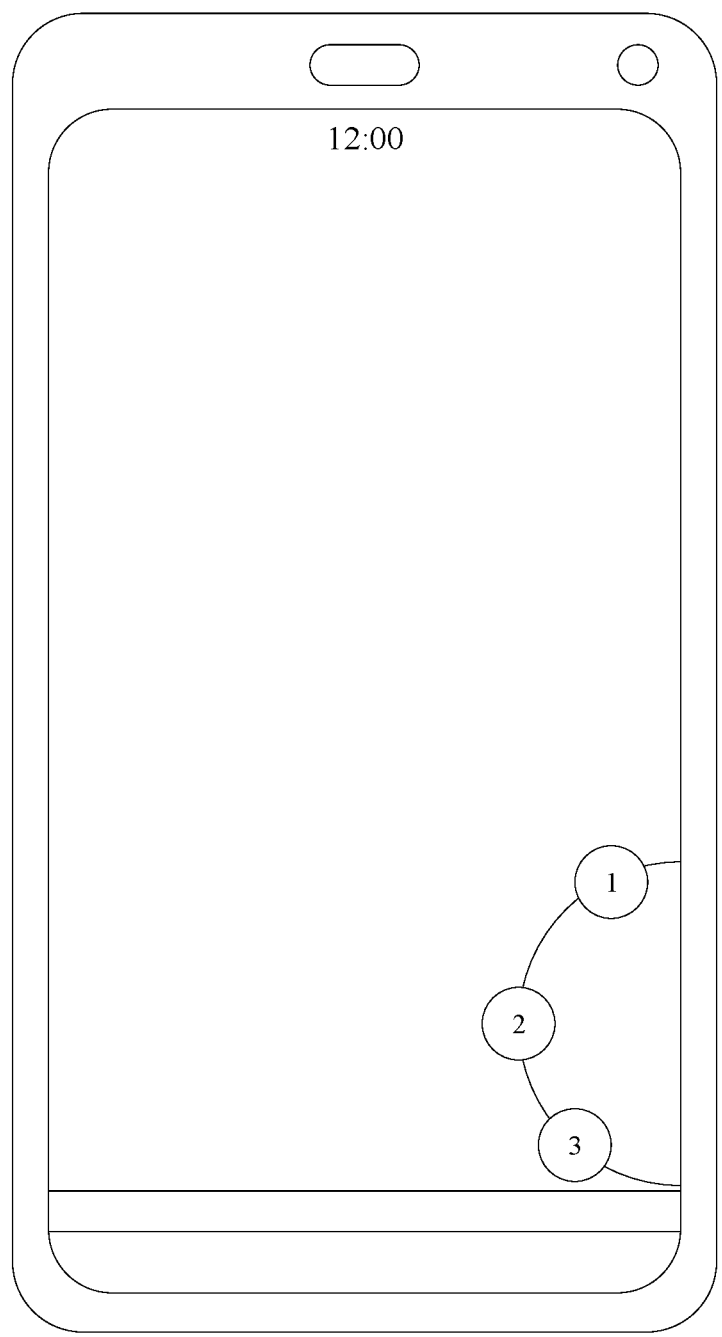
FIG. 3 is a second schematic diagram of an interface according to an embodiment of this application.

FIG. 3 is a second schematic diagram of an interface according to an embodiment of this application. As shown in FIG. 3, there are icons of a plurality of application programs that are currently running in the background in a first target control in a shape of a half disk, such as icons of application programs that are labeled 1, 2, and 3 in FIG. 3. The icons of these application programs are distributed around the half disk, and a user can click on the icons of these application programs to further operate the background application program, such as closing the application program, and switching the application program from running in the background to running in the foreground.

In a schematic diagram of an interface shown in FIG. 3, a shape of the first target control is a half disk. In other embodiments of this application, the first target control may also be of other shapes, such as a rectangle and a polygon.

In the schematic diagram of the interface shown in FIG. 3, a display position of the first target control is located at the bottom right edge of a display screen of an electronic device. In other embodiments of this application, the display position of the first target control can also be adjusted based on an actual situation. This is not specifically limited in the embodiments of this application.

During use of the electronic device, the application program switches between running in the foreground and running in the background according to the user's needs. In the embodiments of this application, a process of switching the application program from running in the foreground to running in the background is described.

Figure 4:
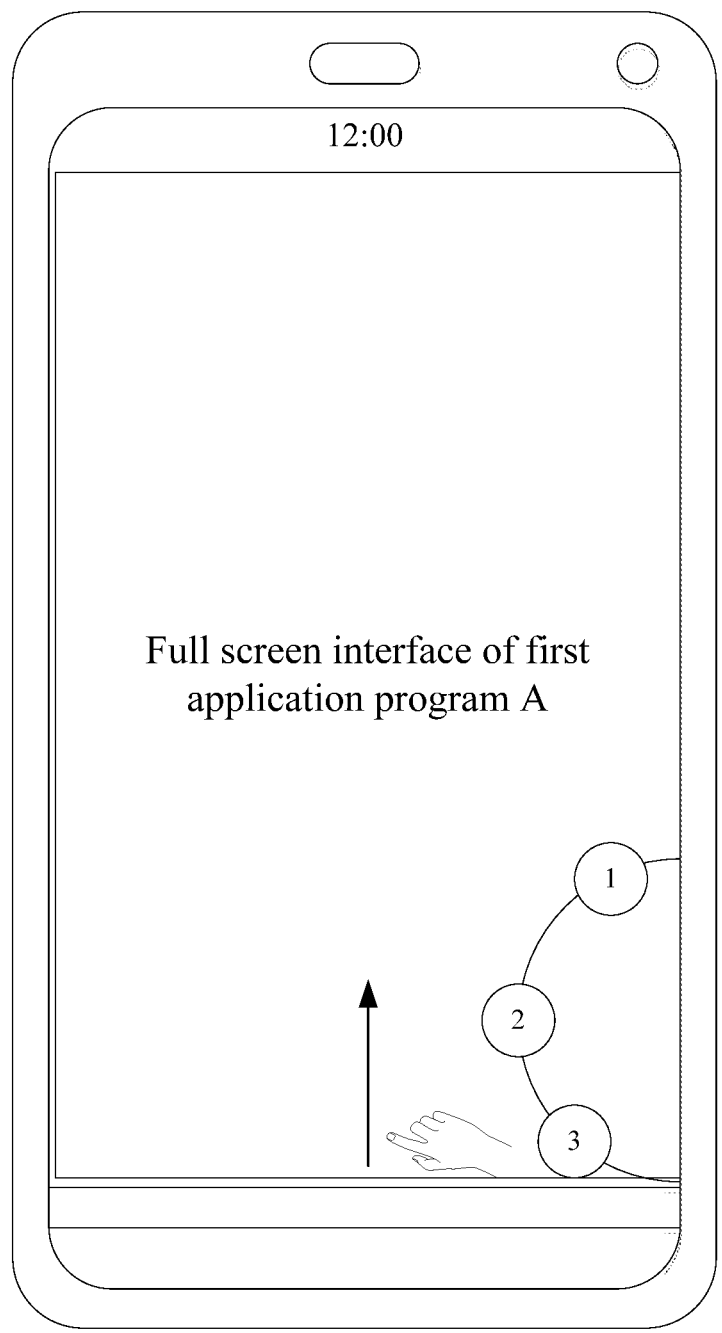
FIG. 4 is a third schematic diagram of an interface according to an embodiment of this application.

In the embodiments of this application, the application program that runs in the foreground is recorded as a first application program, and the electronic device receives a second input by the user into the first application program. In some implementations, the second input is a tab upward swiping operation initiated from the bottom of display screen of the electronic device. FIG. 4 is a third schematic diagram of an interface according to an embodiment of this application. As shown in FIG. 4, the upward swiping operation initiated by the user from the bottom of the display screen is the second input.

In response to the second input, a running interface of the first application program becomes smaller, for example, changing from a full screen interface (that is, the first interface) when the first application program runs in the foreground to a thumbnail of the first application program (that is, a thumbnail of the first interface).

Figure 5:
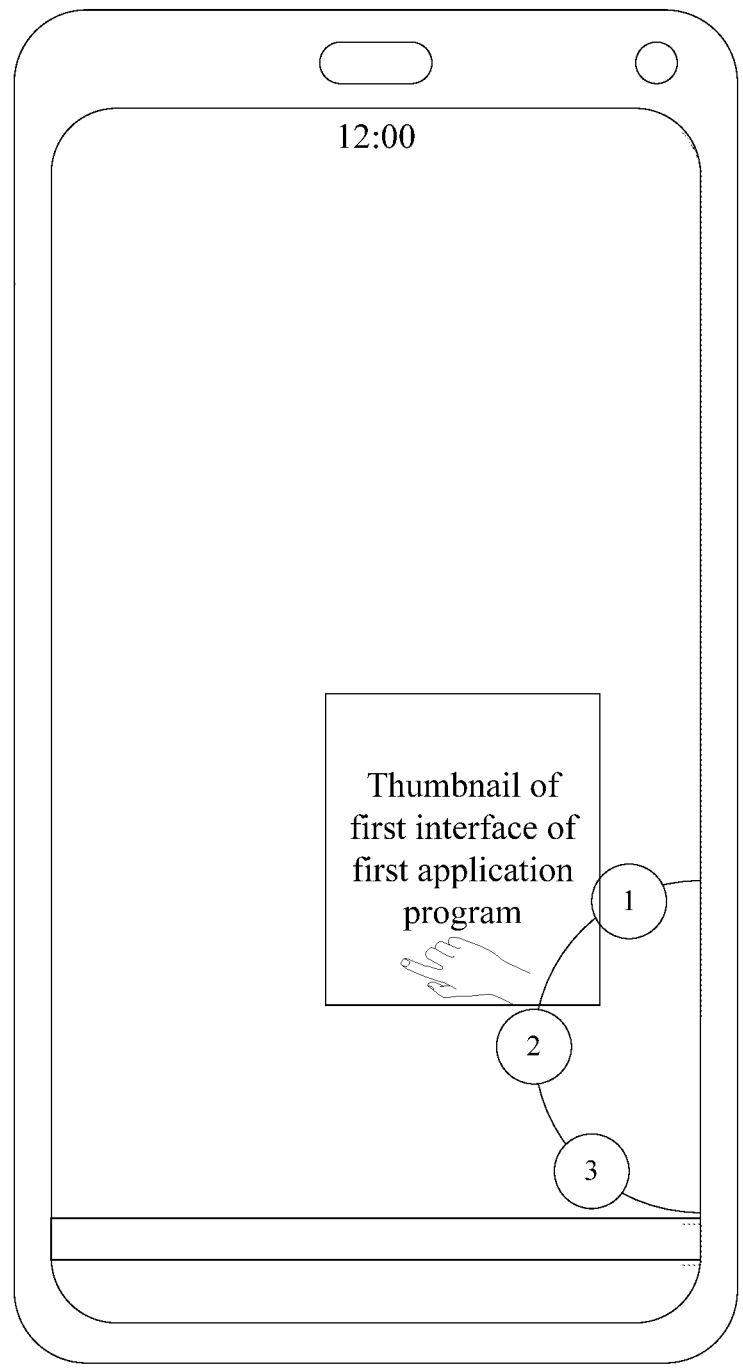
FIG. 5 is a fourth schematic diagram of an interface according to an embodiment of this application.

After the running interface of the first application program becomes smaller, a third input by the user into the thumbnail of the first interface of the first application program continued to be received. In some implementations, in the embodiments of this application, an operation corresponding to the third input is to drag the thumbnail of the first interface of the first application program and move it to a position of the first target control. FIG. 5 is a fourth schematic diagram of an interface according to an embodiment of this application. As shown in FIG. 5, the user drags the thumbnail of the first interface of the first application program A and moves the thumbnail to the half disk (that is, the first target control).

In response to the third input, the first application program switches from running in the foreground to running in the background. How to switch an application program from running in the foreground to running in the background is common knowledge to a person skilled in the art. Therefore, descriptions are not repeated herein.

Figure 6:
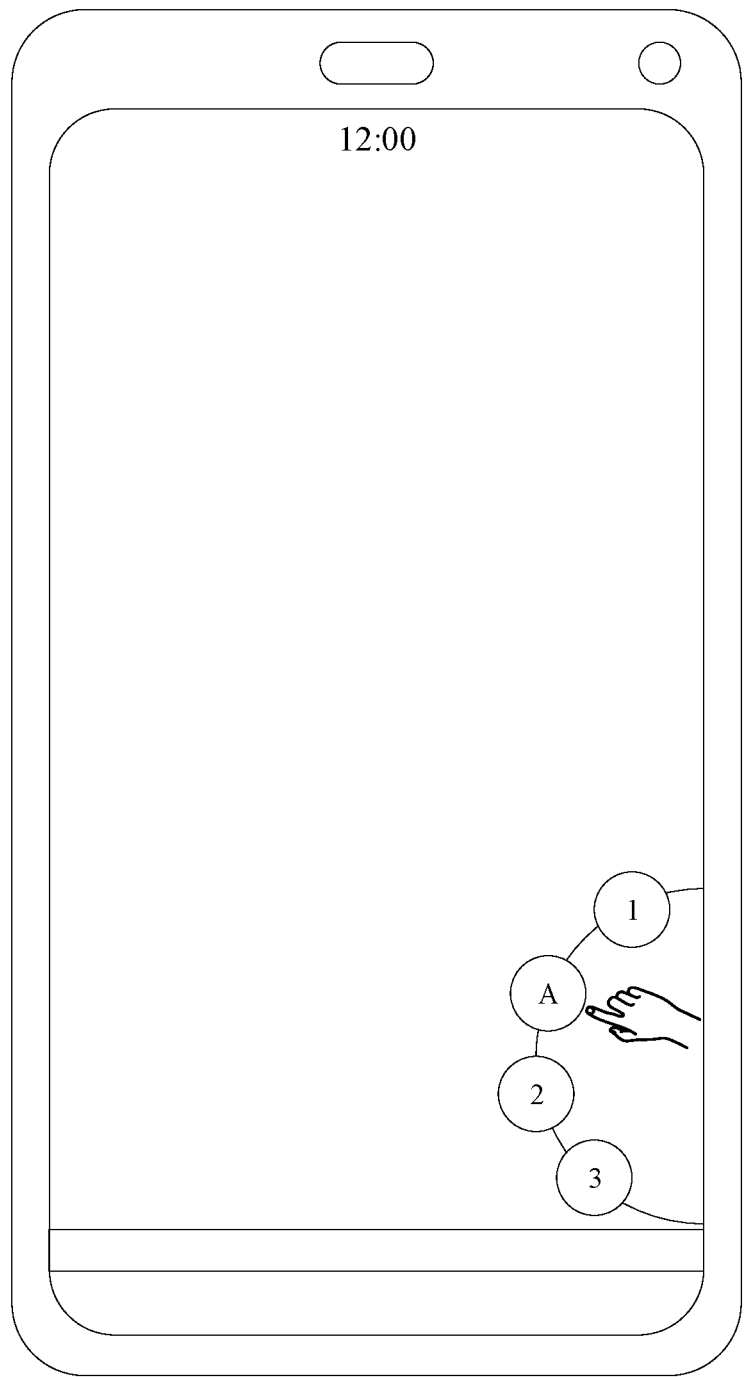
FIG. 6 is a fifth schematic diagram of an interface according to an embodiment of this application.

After the first application program runs in the background, the identifier of the first application program can further be added to the first target control. FIG. 6 is a fifth schematic diagram of an interface according to an embodiment of this application. As shown in FIG. 6, compared to the first target control shown in FIG. 5, the first target control in FIG. 6 adds an icon of the first application program A.

In the method for running an application program provided in the embodiments of this application, a first input by a user is received; in response to the first input, a first target control is displayed; a second input by the user into a first application program that runs in the foreground is received; in response to the second input, a thumbnail of a first interface of the first application program is displayed; a third input by the user into the thumbnail of the first interface of the first application program is received; and in response to the third input, the first application program is switched to run in the background and an identifier of the first application program is displayed in the first target control. In this method, quick switching the application program from running in the foreground to running in the background can be implemented, so that the background application program is easier to operate and manage, thereby improving user experience and operation experience.

In another embodiment of this application, on the basis of the foregoing embodiment, the method further includes:
  in a case that the first target control is not displayed and a second application program receives a message, displaying the first target control, an identifier of the second application program, and the message received by the second application program, where the first target control contains the identifier of the second application program;
  receiving a fourth input by the user into the message received by the second application program; and
  in response to the fourth input, displaying an information input control used for replying to the message received by the second application program.

In some embodiments, the first target control is usually hidden, and when receiving an external message, the second application program that runs in the background needs to remind the user. In the embodiments of this application, the user is reminded in a way that the first target control, the identifier of the second application program, and the message received by the second application program are simultaneously displayed.

Figure 7:
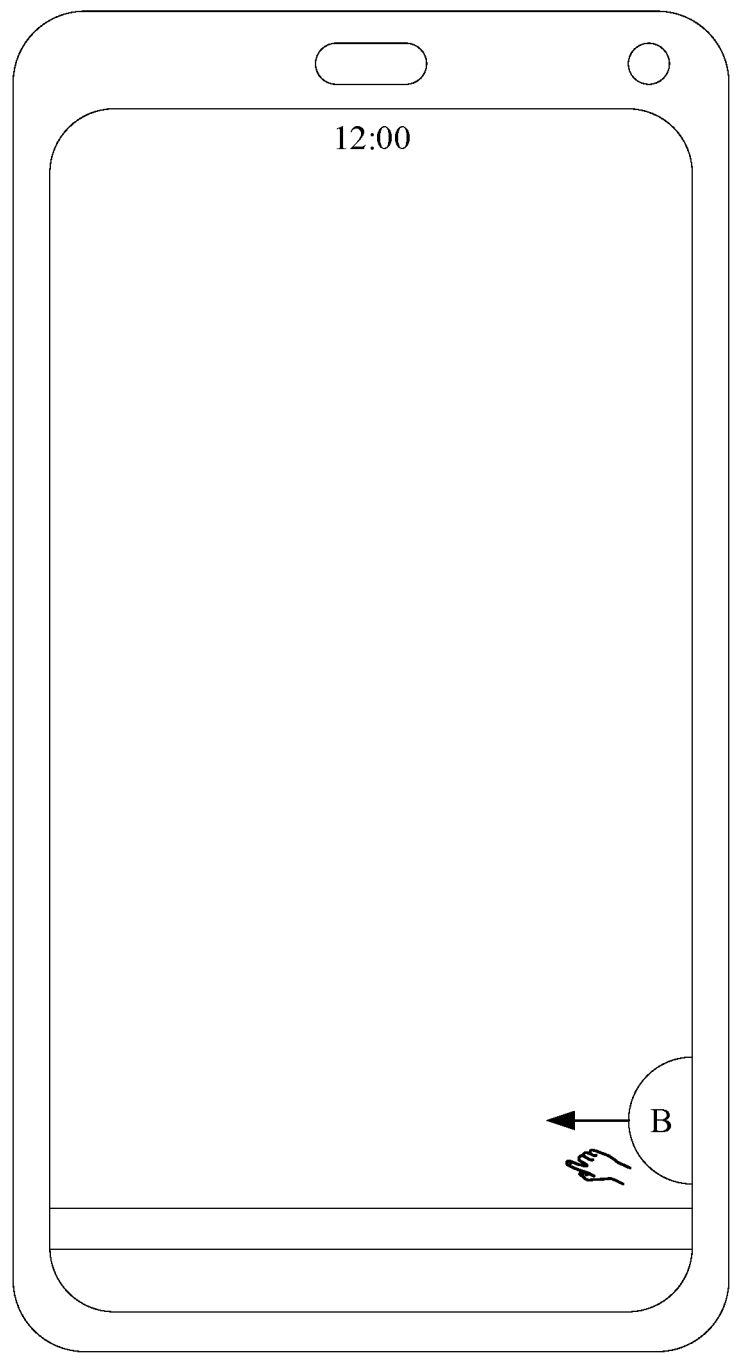
FIG. 7 is a sixth schematic diagram of an interface according to an embodiment of this application.
Figure 8:
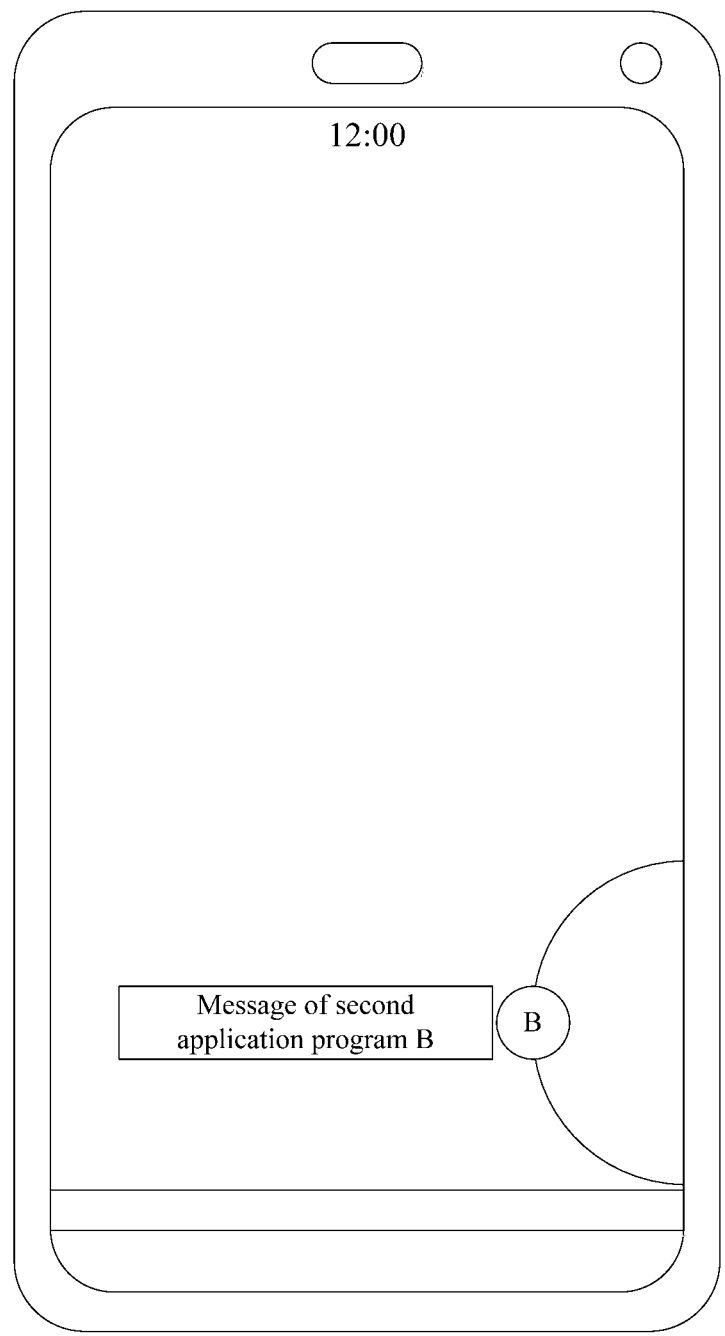
FIG. 8 is a seventh schematic diagram of an interface according to an embodiment of this application.

When the first target control, the identifier of the second application program, and the message received by the second application program are displayed, the identifier of the second application program can be first displayed, for example, a half of an icon of the second application program is first displayed and the half of the icon of the second application program vibrates within a set time range, and then an unread message received by the second application program is displayed together with the identifier of the second application program and the first target control. FIG. 7 is a sixth schematic diagram of an interface according to an embodiment of this application. As shown in FIG. 7, after receiving a message, a second application program B displays a half of an icon and the half of the icon vibrates. FIG. 8 is a seventh schematic diagram of an interface according to an embodiment of this application. As shown in FIG. 8, an unread message of a second application program B is displayed together with an icon of the second application program B and a partial half disk connected to the icon of the second application program B.

After the user sees the message received by the second application program, the user can implement a fourth input into the message received by the second application program, for example, clicking on the message received by the second application program. In response to the fourth input, the electronic device can display an information input control for replying to the message received by the second application program. For example, a message dialog box is displayed.

In the displayed information input control, the user can enter a reply message. After receiving an input by the user to confirm sending the reply message, the information input control can automatically switch the second application program from running in the background to running in the foreground, so that the second application program sends the reply message.

In the method for running an application program provided in the embodiments of this application, in a case that the first target control is not displayed and a second application program receives a message, the first target control, an identifier of the second application program, and the message received by the second application program are displayed; a fourth input by the user into the message received by the second application program is received; and in response to the fourth input, an information input control used for replying to the message received by the second application program is displayed. In this method, rapid processing of the message received by the background application program is implemented, so that the background application program is easier to operate and manage, thereby improving user experience and operation experience.

In another embodiment of this application, on the basis of the foregoing embodiment, the method further includes:
  receiving a fifth input by the user into the first target control; and
  in response to the fifth input, hiding the first target control.

In some embodiments, the first target control needs to be displayed on the display interface of the electronic device only when the user needs to operate the background application program, otherwise the user is affected. Therefore, in the embodiments of this application, a hiding process of the first target control is described.

Figure 9:
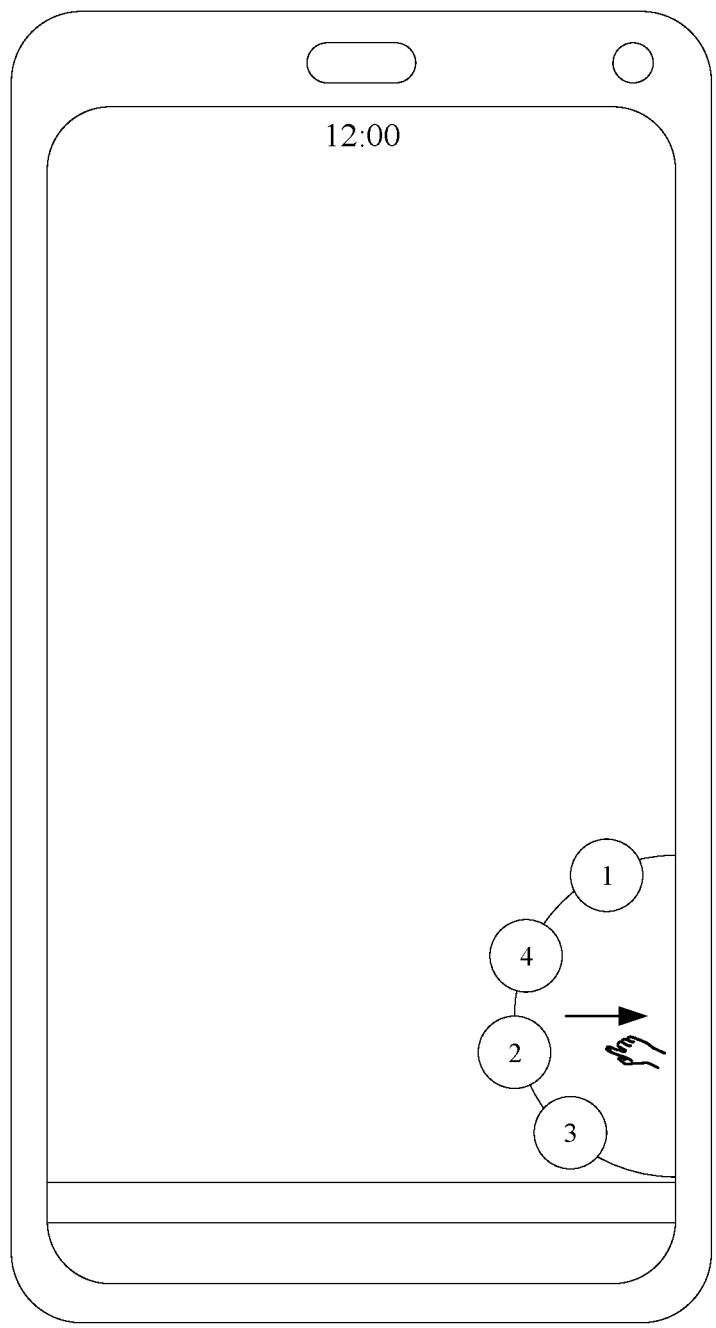
FIG. 9 is an eighth schematic diagram of an interface according to an embodiment of this application.

First, a fifth input by the user into the first target control is received. In some implementations, the fifth input by the user is a swiping operation on the display screen of the electronic device. The swiping operation occurs in a specific area on the display screen. FIG. 9 is an eighth schematic diagram of an interface according to an embodiment of this application. As shown in FIG. 9, a swiping operation is performed towards a screen edge on the half disk (the first target control), and the swiping operation is the fifth input by the user into the first target control.

Figure 10:
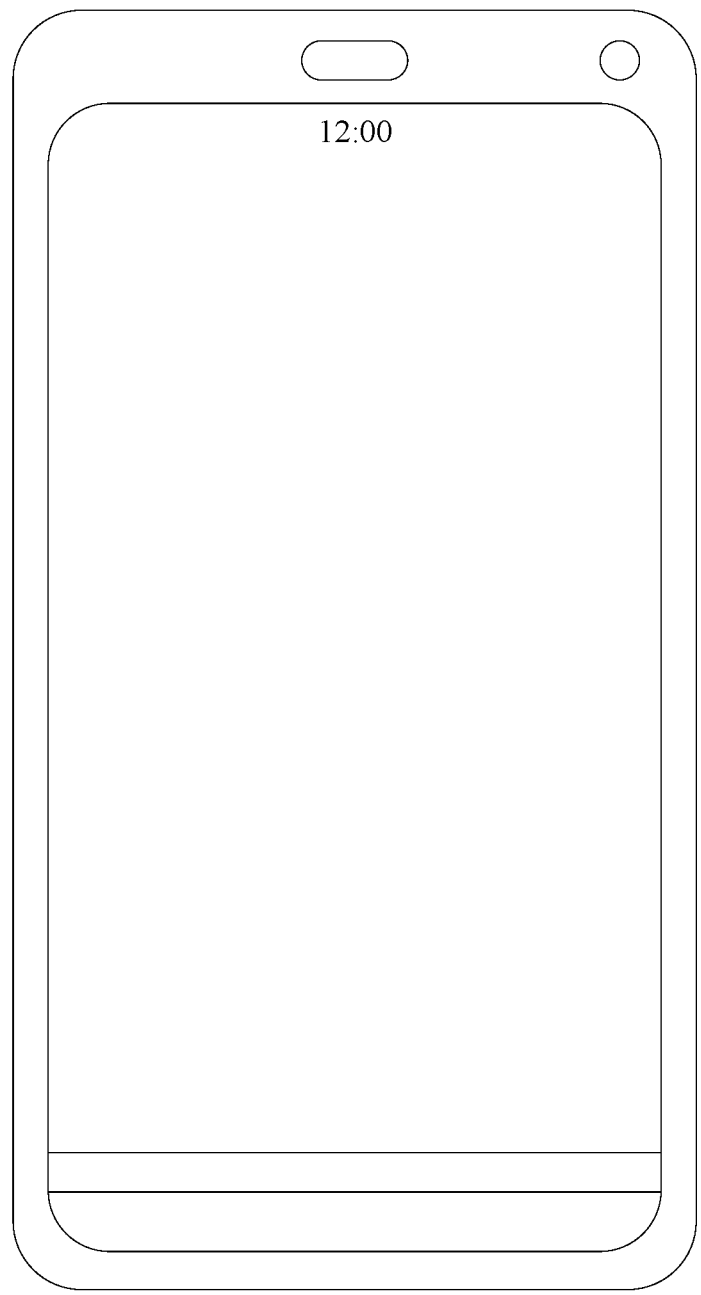
FIG. 10 is a ninth schematic diagram of an interface according to an embodiment of this application.

In response to the fifth input, the electronic device hides the first target control. FIG. 10 is a ninth schematic diagram of an interface according to an embodiment of this application. As shown in FIG. 10, the half disk (the first target control) returns to the screen edge and is no longer displayed on the interface of the electronic device.

In the method for running an application program provided in the embodiments of this application, the fifth input by the user into the first target control is received, and in response to the fifth input, the first target control is hidden, so as to hide the first target control. In this method, the background application program is easier to operate and manage, thereby improving user experience and operation experience.

In another embodiment of this application, on the basis of the foregoing embodiment, the method further includes:
  receiving a sixth input by the user into an identifier of a third application program in the first target control; and
  in response to the sixth input, switching the third application program to run in the foreground.

In some embodiments, during use of the electronic device, the application program switches between running in the foreground and running in the background according to the user's needs. In the embodiments of this application, a process of switching the application program from running in the background to running in the foreground is described.

Figure 11:
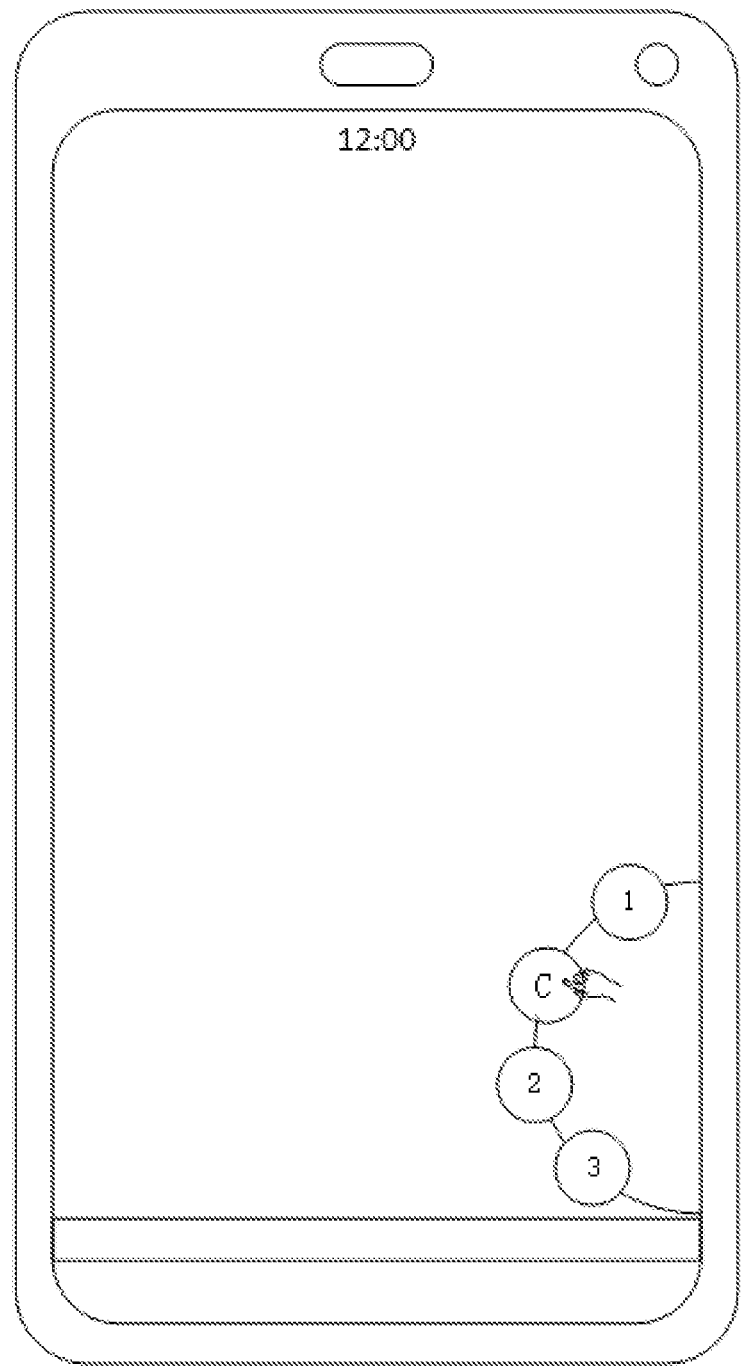
FIG. 11 is a tenth schematic diagram of an interface according to an embodiment of this application.

First, a sixth input by the user into an identifier of a third application program in the first target control is received. The third application program is an application program that runs in the background, and the first target control contains an identification of the third application program. In some implementations, the sixth input by the user is a touch-and-hold operation on the identifier of the third application program. FIG. 11 is a tenth schematic diagram of an interface according to an embodiment of this application. As shown in FIG. 11, the user performs a touch-and-hold operation on an icon of the third application program C.

Figure 12:
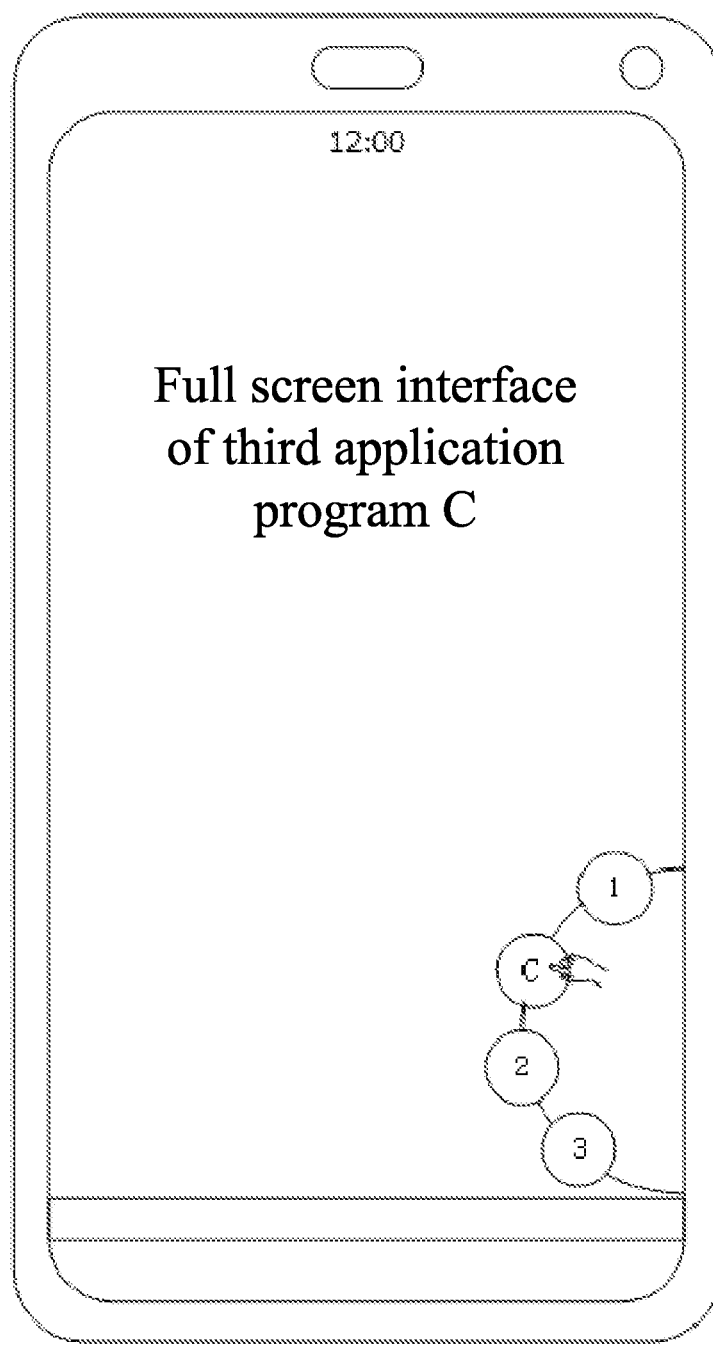
FIG. 12 is an eleventh schematic diagram of an interface according to an embodiment of this application.

Second, in response to the sixth input, the third application program is switched to run in the foreground. How to switch an application program from running in the foreground to running in the background is common knowledge to a person skilled in the art. Therefore, descriptions are not repeated herein. FIG. 12 is an eleventh schematic diagram of an interface according to an embodiment of this application. Compared to FIG. 11, in FIG. 12, a current interface of the electronic device is changed to an interface of the third application program C when the third application program C runs in the foreground.

It should be noted that after the third application program is switched to run in the foreground, the first target control no longer contains the identifier of the third application program. In addition, the current interface of the electronic device is switched to the interface of the third application program when the third application program runs in the foreground.

In the method for running an application program provided in the embodiments of this application, a sixth input by the user into an identifier of a third application program in the first target control is received, and in response to the sixth input, the third application program is switched to run in the foreground. In this method, quick switching the application program from running in the foreground to running in the background can be implemented, so that the background application program is easier to operate and manage, thereby improving user experience and operation experience.

In another embodiment of this application, on the basis of the foregoing embodiment, the method further includes:

receiving a seventh input by the user into an identifier of a fourth application program in the first target control; and in response to the seventh input, closing the fourth application program.

In some embodiments, opening excessive application programs is a heavy burden on the electronic device, thereby consuming both storage and computing resources. Therefore, an application program that is not in use in a short time can be closed. In the embodiments of this application, a process of closing the application program that runs in the background is described.

Figure 13:
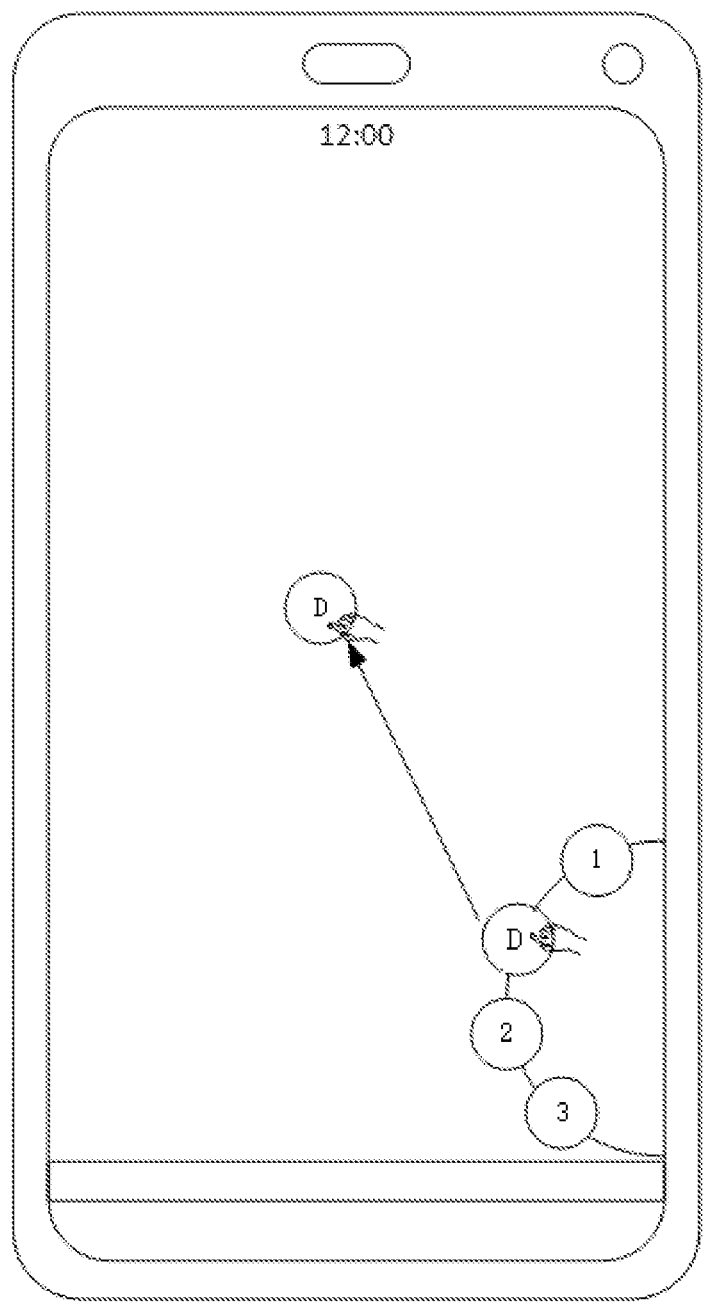
FIG. 13 is a twelfth schematic diagram of an interface according to an embodiment of this application.

First, the seventh input by the user into the identifier of the fourth application program in the first target control. The fourth application program is an application program that runs in the background, and the first target control contains the identifier of the fourth application program. In some implementations, an operation corresponding to the seventh input by the user is to touch and hold the identifier of the fourth application program in the first target control and drag it to a middle area of the display screen of the electronic device. FIG. 13 is a twelfth schematic diagram of an interface according to an embodiment of this application. As shown in FIG. 13, the user touches and holds an icon of the fourth application program D to detach the icon from the half disk (the first target control) and drag the icon to a middle area of a screen.

Second, in response to the seventh input, the electronic device closes the fourth application program. Closing the fourth application program means closing a process of the fourth application program. How to close a process of an application program is common knowledge to a person in the prior art. Descriptions are not repeated herein.

Figure 14:
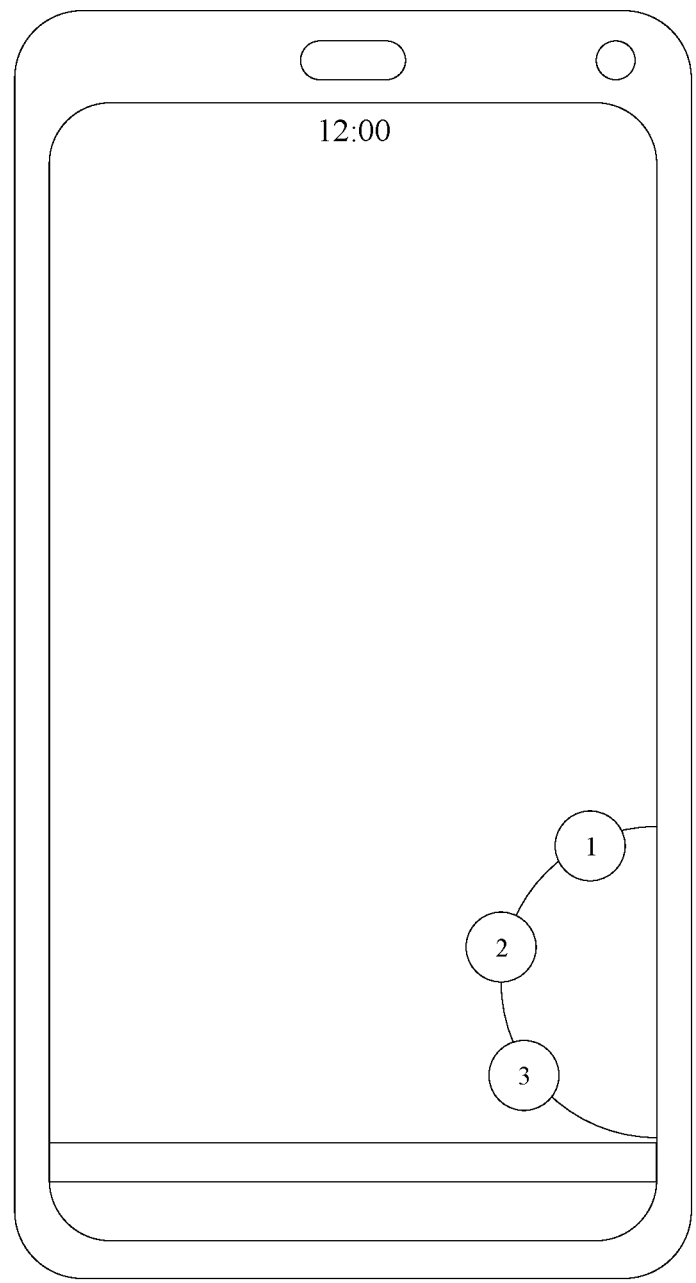
FIG. 14 is a thirteenth schematic diagram of an interface according to an embodiment of this application.

It should be noted that after the fourth application program is closed, the first target control no longer contains the identifier of the fourth application program. Correspondingly, a sequence between identifiers of other application programs in the first target control is also adjusted accordingly. In addition, if there is an application program that runs in the background but an identifier of the application program is not displayed in the first target control, the identifier of the application program is added to the first target control. FIG. 14 is a thirteenth schematic diagram of an interface according to an embodiment of this application. Compared with FIG. 13, in FIG. 14, the icon of the application program contained in the half disk (the first target control) has changed.

In the method for running an application program provided in the embodiments of this application, the seventh input by the user into the identifier of the fourth application program in the first target control is received; and in response to the seventh input, the fourth application program is closed. In this method, rapid closure of the application program that runs in the background can be implemented, so that the background application program is easier to operate and manage, thereby improving user experience and operation experience.

In another embodiment of this application, on the basis of the foregoing embodiment, the method further includes:
receiving an eighth input by the user into an identifier of a fifth application program that does not run; and
in response to the eighth input, preloading a resource for the fifth application program, where the fifth application program runs in the background, and displaying the identifier of the fifth application program in the first target control.

In some cases, the user wants to open an application program by running the application program in the background first, and then switch the application program to run in the foreground when needed. In this way, corresponding time can be shortened when the application program needs to be used.

Based on this, in the embodiments of this application, first, an eighth input by the user into an identifier of a fifth application program that does not run is received. The fifth application program is an application program that does not run and has not loaded a resource required when the application program runs. In some implementations, an operation corresponding to the eighth input by the user is to drag an identifier of the fifth application program to the first target control.

Figure 15:
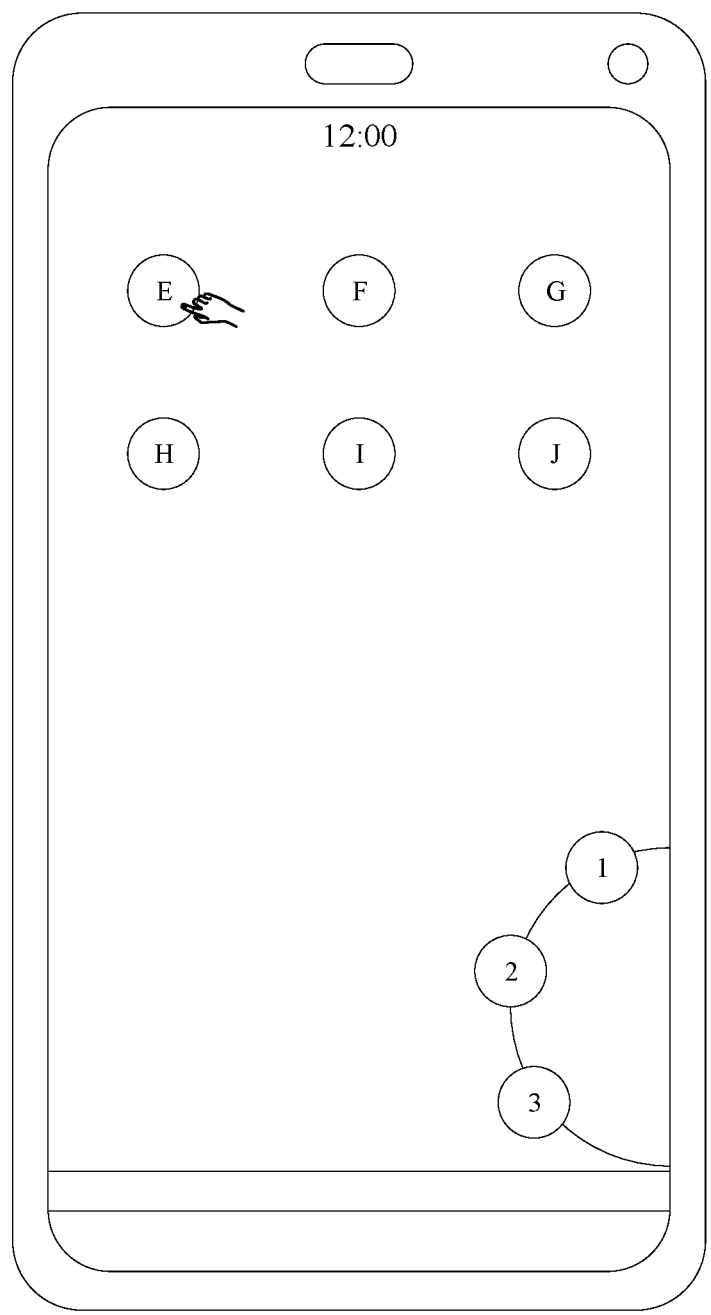
FIG. 15 is a fourteenth schematic diagram of an interface according to an embodiment of this application.
Figure 16:
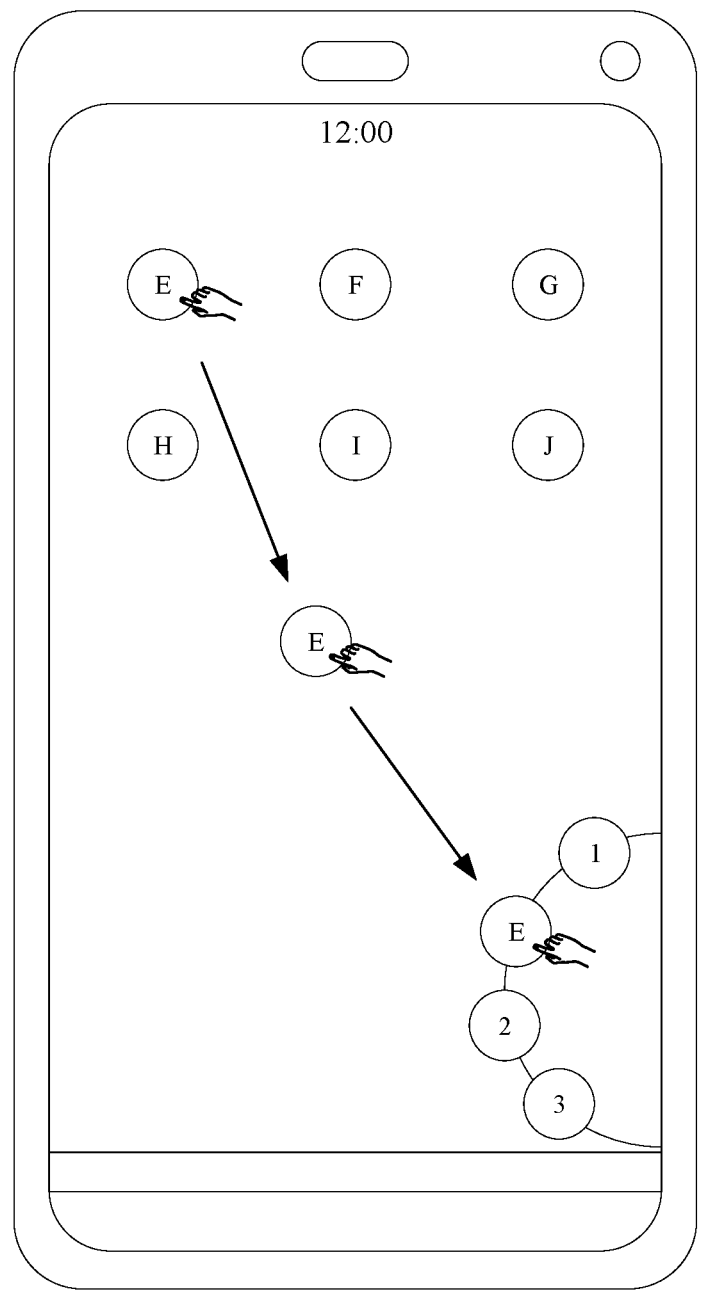
FIG. 16 is a fifteenth schematic diagram of an interface according to an embodiment of this application.

FIG. 15 is a fourteenth schematic diagram of an interface according to an embodiment of this application, and FIG. 16 is a fifteenth schematic diagram of an interface according to an embodiment of this application. As shown in FIG. 15 and FIG. 16, the user selects an icon of a fifth application program E on a desktop and then drags it to the half disk (the first target control).

Second, in response to the eighth input, a resource for the fifth application program is preloaded, where the fifth application program runs in the background, and the identifier of the fifth application program in the first target control is displayed. How to preload a resource for an application program is common knowledge to a person skilled in the art. Therefore, descriptions are not repeated herein.

After the fifth application program runs in the background, the first target control can add the identifier of the fifth application program. Compared to FIG. 15, the half disk (the first target control) in FIG. 16 adds an icon of the fifth application program E.

After the fifth application program runs in the background, when the user wants to open the fifth application program, the user can directly open the application program without loading the resource again.

In the method of the application program provided in the embodiments of this application, the eighth input by the user into the identifier of the fifth application program that does not run is received; and in response to the eighth input, a resource for the fifth application program is preloaded, where the fifth application program runs in the background, and the identifier of the fifth application program in the first target control is displayed. In this method, the resource for the application program is preloaded and the application program runs in the background, so that the background application program is easier to operate and manage, thereby improving user experience and operation experience.

In another embodiment of this application, on the basis of the foregoing embodiment, the method further includes:
receiving a ninth input by the user into the first target control; and
in response to the ninth input, displaying in sequence the identifiers of the application programs that run in the background and that are contained in the first target control.

In some embodiments, the first target control can display a limited quantity of identifiers of the background application programs on a screen. When there is a large quantity of application programs that run in the background, the first target control may not be able to fully display the identifiers of all the application programs that run in the background. Therefore, in the embodiments of this application, the identifiers of the application programs that run in the background contained in the first target control are displayed in sequence by performing specific operations.

Figure 17:
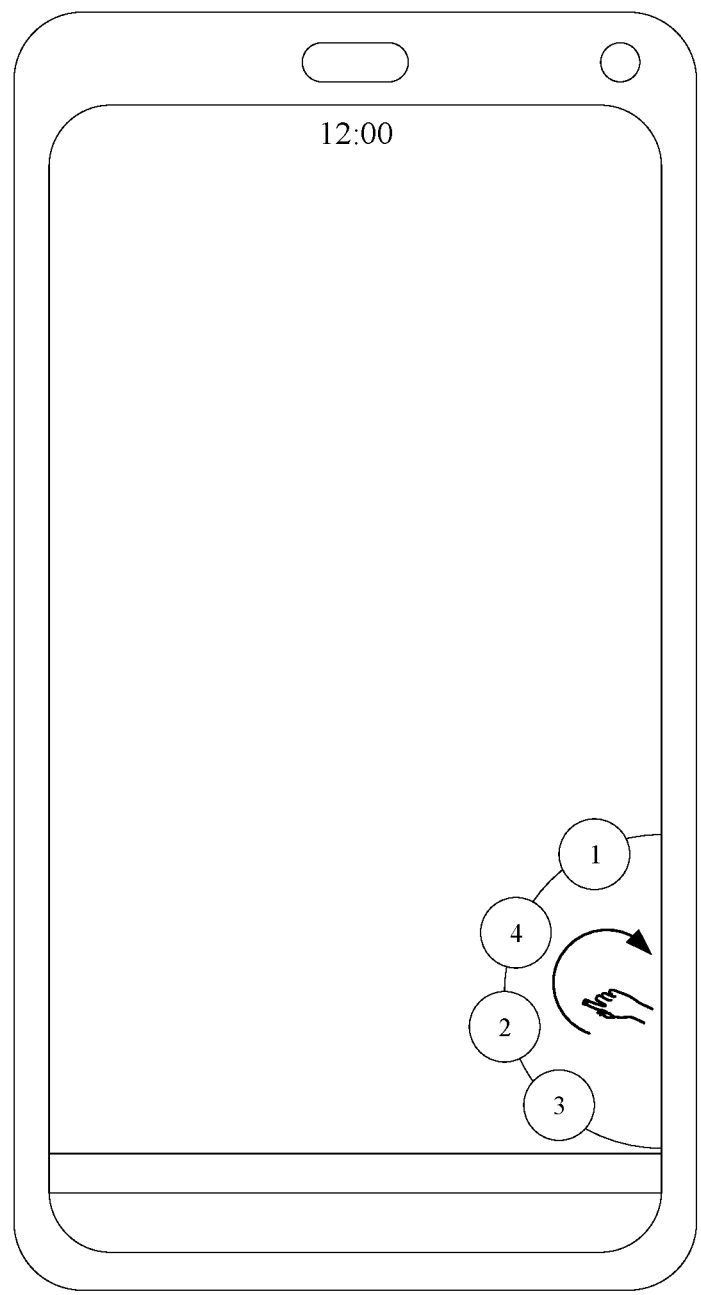
FIG. 17 is a sixteenth schematic diagram of an interface according to an embodiment of this application.

In some embodiments, first, the ninth input by the user into the first target control is received. An operation corresponding to the ninth input is an operation of rotating the first target control clockwise or counterclockwise. FIG. 17 is a sixteenth schematic diagram of an interface according to an embodiment of this application. As shown in FIG. 17, the user performs a clockwise rotation operation on the half disk (the first target control).

Figure 18:
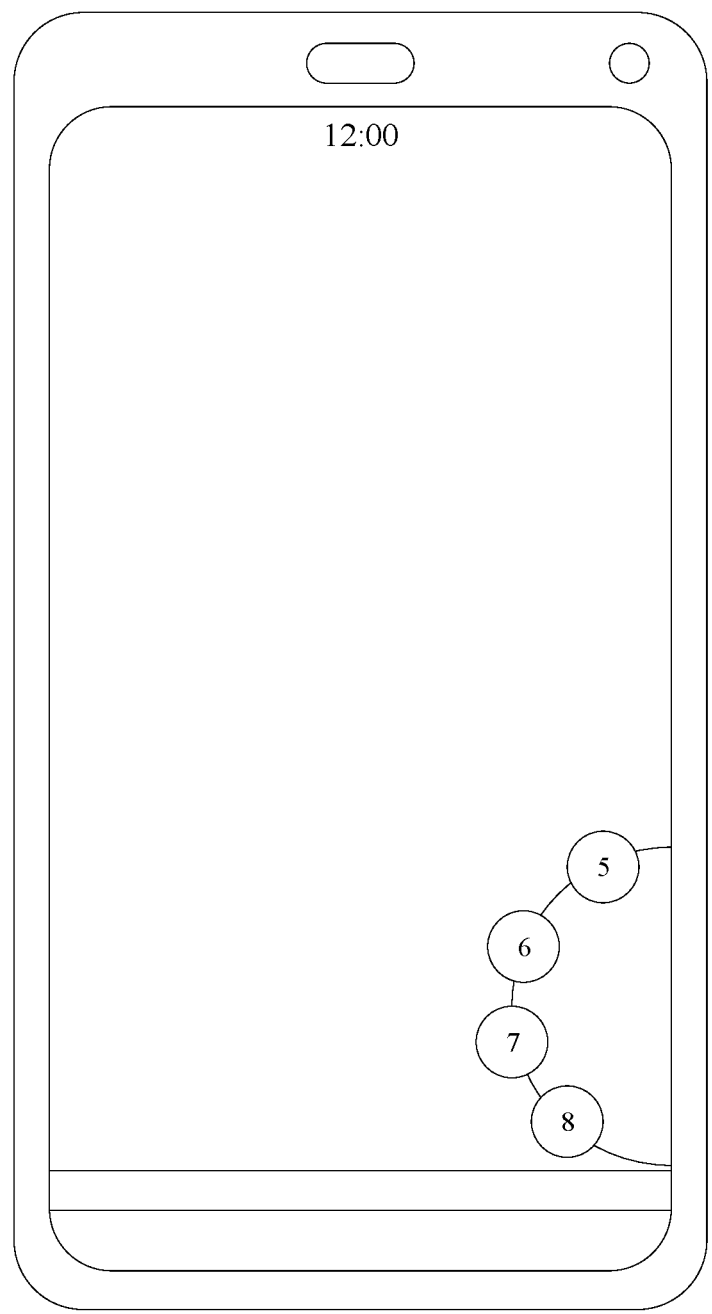
FIG. 18 is a seventeenth schematic diagram of an interface according to an embodiment of this application.

Second, in response to the ninth input, the identifiers of the application programs that run in the background and that are contained in the first target control are displayed in sequence. The electronic device responds to the ninth input, and the identifier of the application program displayed on the first target control of a display screen changes. For example, the application programs that run in the background are displayed one by one in a way of a rotating disc. FIG. 18 is a seventeenth schematic diagram of an interface according to an embodiment of this application. Compared to FIG. 17, the icon of the application program displayed on the half disk (the first target control) in FIG. 18 has changed.

In the method for running an application program provided in the embodiments of this application, the ninth input by the user into the first target control is received; and in response to the ninth input, the identifiers of the application programs that run in the background and that are contained in the first target control are displayed in sequence.

In another embodiment of this application, on the basis of the foregoing embodiment, the method further includes:

in a case that the interface of the foreground application program is displayed, receiving a tenth input by the user; and in response to the tenth input, displaying a second target control, where the second target control contains an identifier of a sixth application program, and the sixth application program is an application program that is used more frequently than a first threshold or ranked higher than a second threshold in terms of a frequency of being used within a preset time period.

In the prior art, management of frequently-used application program usually involves setting an icon of the frequently-used application program in a special position, for example, directly below the desktop. The user can open the frequently-used application program by clicking on the icon when needed. There are certain problems with this implementation. First, the frequent-used application program needs to be manually set and cannot be automatically adjusted based on recent usage frequency. Second, when the user clicks on the icon of the frequent-used application program, the user needs to exit the interface of the foreground application program, which is relatively cumbersome.

In the method for running an application program provided in the embodiments of this application, the background application program can be easily and quickly managed. In addition, in a case that the interface of the foreground application program is displayed, the frequently-used application program can also be easily and quickly managed.

Figure 19:
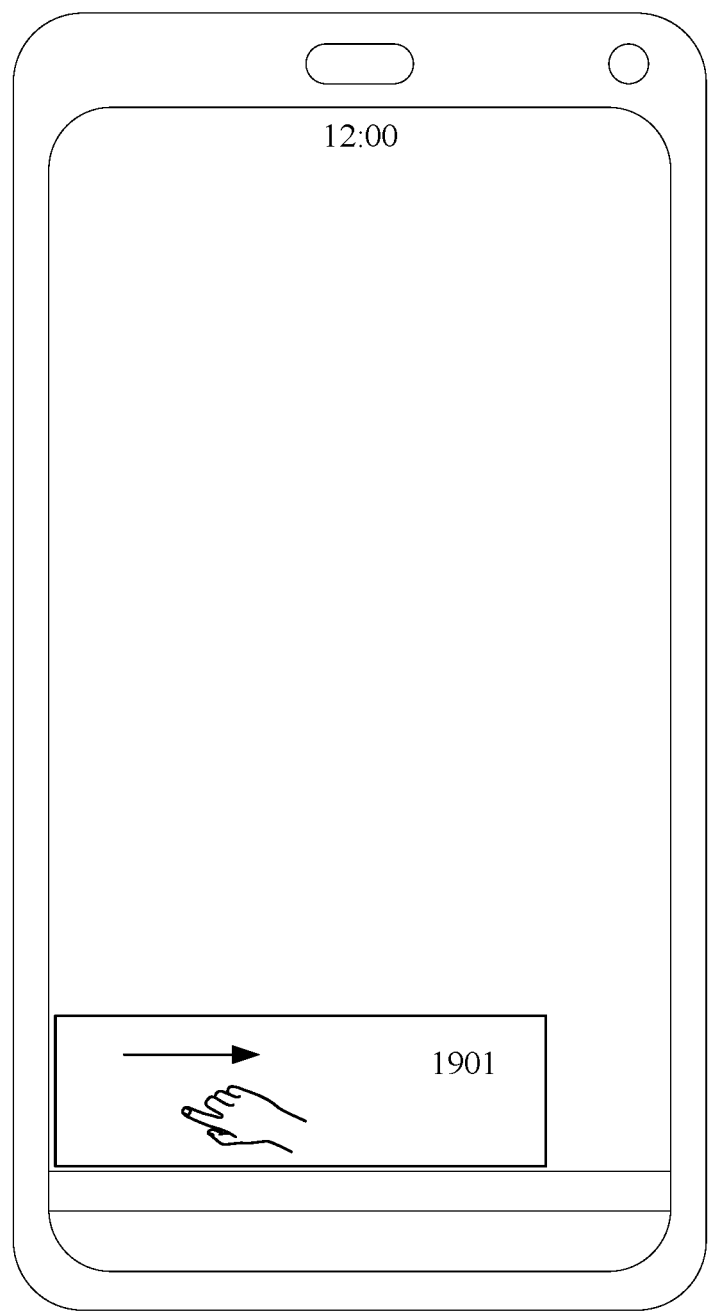
FIG. 19 is an eighteenth schematic diagram of an interface according to an embodiment of this application.

Therefore, in the embodiments of this application, first, in a case that the interface of the foreground application program is displayed, the tenth input by the user is received. In some implementations, the tenth input by the user is a swiping operation on the display screen of the electronic device. The swiping operation occurs in a specific area on the display screen. FIG. 19 is an eighteenth schematic diagram of an interface according to an embodiment of this application. As shown in FIG. 19, an area 1901 is set at a bottom left edge of the display screen of the electronic device, and a swiping operation of the user within the area 1901 is recognized as the tenth input by the user.

Second, in response to the tenth input, a second target control is displayed, where the second target control contains an identifier of a sixth application program, and the sixth application program is an application program that is used more frequently than a first threshold or ranked higher than a second threshold in terms of a frequency of being used within a preset time period.

In the embodiments of this application, the frequently-used application program is recorded as the sixth application program. The frequently-used application program means an application program that is used more frequently than a first threshold or ranked higher than a second threshold in terms of a frequency of being used within a preset time period. For example, the preset time period is set to 30 days, the first threshold is set to 30 times, and the second threshold is set to 10. Based on a historical record of a quantity of times the application program in the electronic device has been opened, the quantity of times each application program has been opened in the past 30 days can be obtained. If an application program has been opened more than 30 times or is ranked at or above 10 within all application programs in terms of being opened, this application program is considered the sixth application program.

In the embodiments of this application, the second target control is a half disk, and the identifier of the sixth application program is distributed on the half disk. The identifier of the application program may be an icon of the application program, a name of the application program, or another iconic symbol that can represent the application program.

Figure 20:
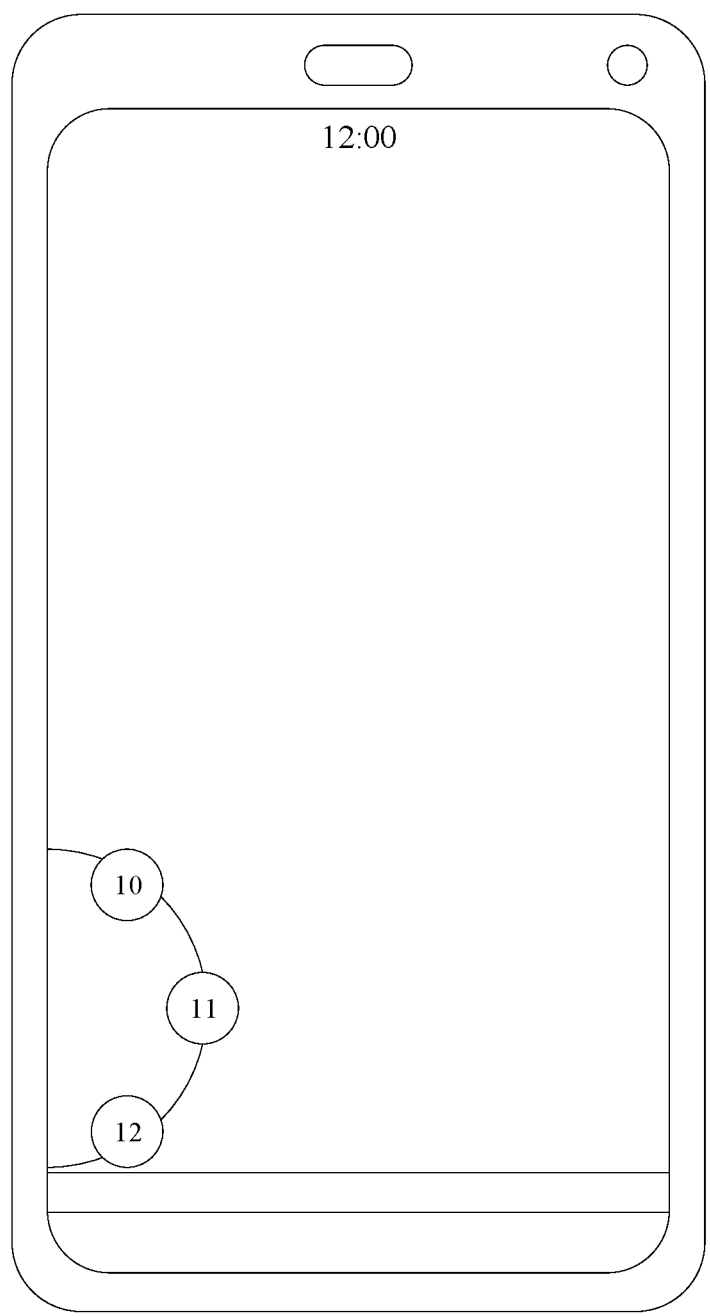
FIG. 20 is a nineteenth schematic diagram of an interface according to an embodiment of this application.

FIG. 20 is a nineteenth schematic diagram of an interface according to an embodiment of this application. As shown in FIG. 20, there are a plurality of icons of the sixth application program in the half-disk shaped second target control, such as icons of application programs that are labeled 10, 11, and 12. Icons of these application programs are distributed around the half disk, and the user can click on the icons of these application programs to further operate the sixth application program, for example, opening or closing the application program.

In the schematic diagram of the interface shown in FIG. 20, the shape of the second target control is a half disk. In other embodiments of this application, the second target control may also be of other shapes, such as a rectangle and a polygon.

In the schematic diagram of the interface shown in FIG. 20, a display position of the second target control is at a bottom left edge of the display screen of the electronic device to distinguish the display position of the second target control from the display position of the first target control. In other embodiments of this application, the display position of the second target control may also be adjusted according to an actual situation. This is not particularly limited in this embodiment of this application.

For further operations on the sixth application program contained in the second target control, such as opening and closing the application program, refer to descriptions of relevant operations on the background application program in the foregoing embodiments of this application. Details are not described herein again.

In the method for running an application program provided in the embodiments of this application, in a case that the interface of the foreground application program is displayed, the tenth input by the user is received; and in response to the tenth input, the second target control is displayed. In this method, in a case that the user does not exit the interface of the foreground application program, the frequently-used application programs are managed quickly and conveniently, so that the frequently-used application programs are easier to operate and manage, thereby improving user experience and operation experience.

It should be noted that an execution subject of the method for running an application program according to an embodiment of this application may be an apparatus for running an application program, or a control module for performing the method for running an application program in the apparatus for running an application program. In the embodiments of this application, the apparatus for running an application program according to an embodiment of this application is described by using an example in which the apparatus for running an application program performs the method for running an application program.

Figure 21:
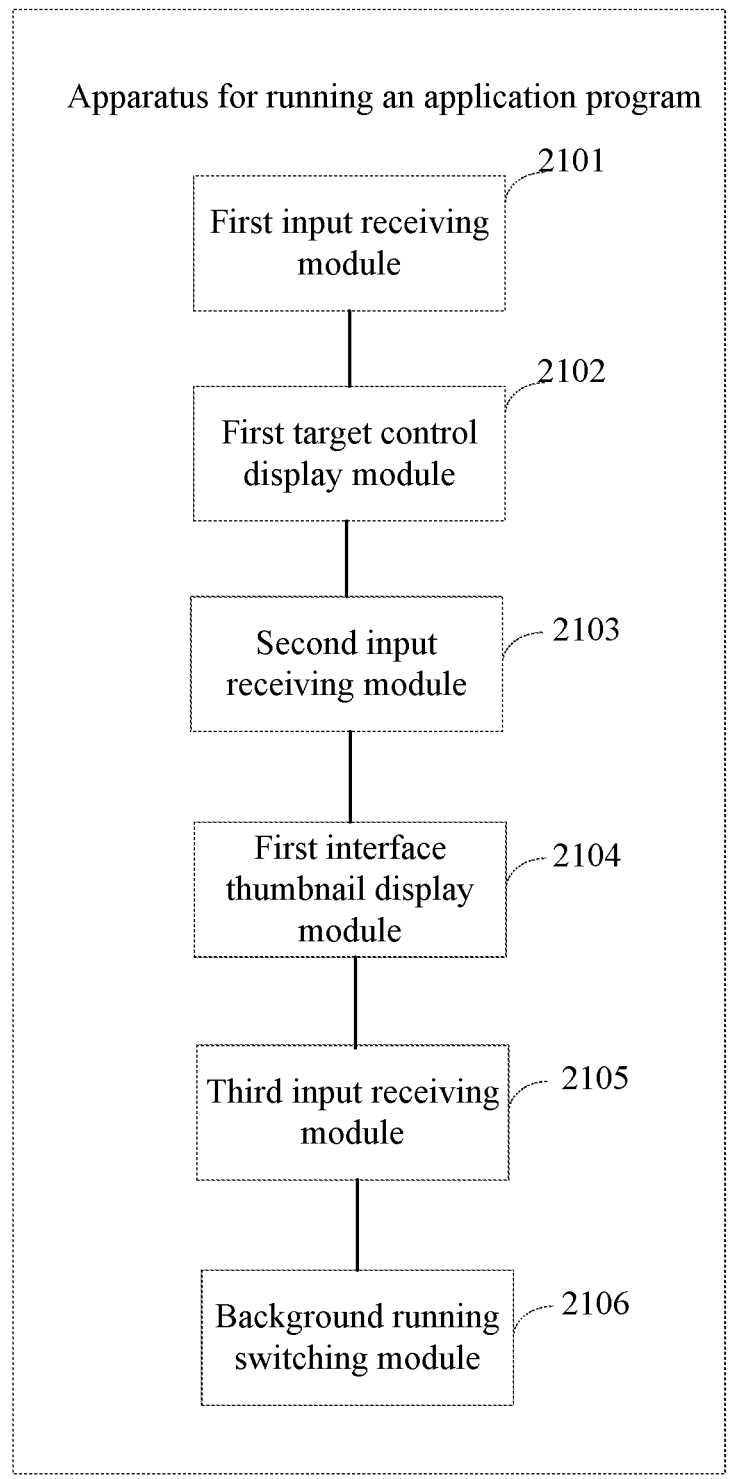
FIG. 21 is a schematic diagram of an apparatus for running an application program according to an embodiment of this application.

FIG. 21 is a schematic diagram of an apparatus for running an application program according to an embodiment of this application, and as shown in FIG. 21, the apparatus includes:
a first input receiving module 2101, configured to receive a first input from a user;
a first target control display module 2102, configured to, in response to the first input, display a first target control, where the first target control contains an identifier of an application program that runs in the background;
a second input receiving module 2103, configured to receive a second input by the user into a first application program that runs in the foreground;
a first interface thumbnail display module 2104, configured to, in response to the second input, display a thumbnail of a first interface of the first application program, where the first interface of the first application program is an interface when the first application program runs in the foreground;
a third input receiving module 2105, configured to receive a third input by the user into the thumbnail of the first interface of the first application program; and
a background running switching module 2106, configured to, in response to the third input, switch the first application program to run in the background and display an identifier of the first application program in the first target control.

In some embodiments, the apparatus further includes:
a display module, configured to, in a case that the first target control is not displayed and a second application program receives a message, display the first target control, an identifier of the second application program, and the message received by the second application program, where the first target control includes the identifier of the second application program;
a fourth input receiving module, configured to receive a fourth input by the user into the message received by the second application program; and
an information input control display module, configured to, in response to the fourth input, display an information input control used for replying to the message received by the second application program.

In some embodiments, the apparatus further includes:
a fifth input receiving module, configured to receive a fifth input by a user; and
a first target control hiding module, configured to, in response to the fifth input, hide the first target control.

In some embodiments, the apparatus further includes:
a sixth input receiving module, configured to receive a sixth input by the user into an identifier of a third application program in the first target control; and
a foreground running switching module, configured to, in response to the sixth input, switch the third application program to run in the foreground.

In some embodiments, the apparatus further includes:
a seventh input receiving module, configured to receive a seventh input by the user into an identifier of a fourth application program in the first target control; and
an application program closing module, configured to, in response to the seventh input, close the fourth application program.

In some embodiments, the apparatus further includes:
an eighth input receiving module, configured to receive an eighth input by the user into an identifier of a fifth application program that does not run; and
the background running switching module, configured to, in response to the eighth input, preload a resource for the fifth application program, where the fifth application program runs in the background, and display the identifier of the fifth application program in the first target control.

In some embodiments, the apparatus further includes:
a ninth input receiving module, configured to receive a ninth input by the user into the first target control; and
a background application program identifier display module, configured to, in response to the ninth input, display in sequence the identifiers of the application programs that run in the background and that are contained in the first target control.

In some embodiments, the first target control is a half disk, and the identifier of the application program that runs in the background is distributed on the half disk.

In some embodiments, the apparatus further includes:
a tenth input receiving module, configured to receive a tenth input by a user; and
a second target control display module, configured to, in response to the tenth input, display a second target control, where the second target control contains an identifier of a sixth application program, and the sixth application program is an application program that is used more frequently than a first threshold or ranked higher than a second threshold in terms of a frequency of being used within a preset time period.

The foregoing apparatus for running an application program provided in the embodiments of this application can implement all the method steps implemented in the foregoing method embodiments, with the same technical effects achieved. The same parts in this embodiment being the same with the method embodiments and the beneficial effects are not described herein again.

The apparatus for running an application program in the embodiments of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The apparatus for running an application program in the embodiments of this application may be an apparatus with an operating system. The operating system may be an Android operating system, may be an iOS operating system, or may be another possible operating system. This is not specifically limited in the embodiments of this application.

The apparatus for running an application program provided in the embodiments of this application can implement the processes implemented by the apparatus for running an application program in the method embodiments in FIG. 1 to FIG. 20. To avoid repetition, details are not described herein again.

Figure 22:
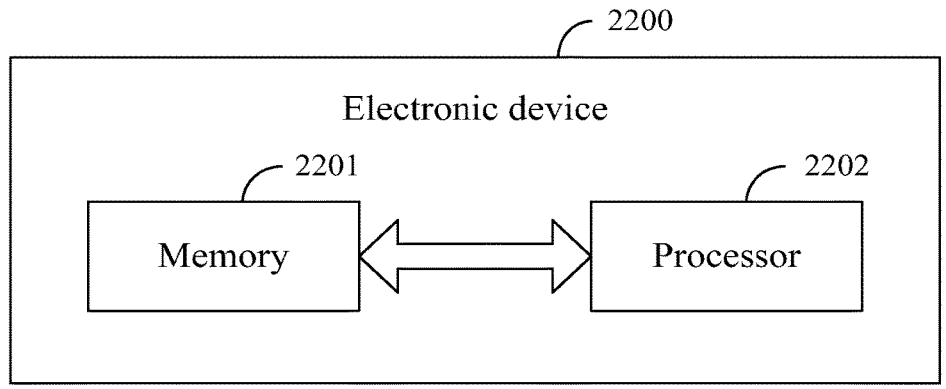
FIG. 22 is a first schematic structural diagram of an electronic device according to an embodiment of this application.

As shown in FIG. 22, an embodiment of this application further provides an electronic device 2200, including a processor 2202, a memory 2201, and a program or an instruction stored in the memory 2201 and capable of running on the processor 2202. When the program or the instruction is executed by the processor 2202, the processes of the foregoing method embodiments for running an application program are implemented, with the same technical effects achieved. To avoid repetition, details are not described herein again.

It should be noted that the electronic device in the embodiments of this application includes the foregoing mobile electronic device and the foregoing non-mobile electronic device.

Figure 23:
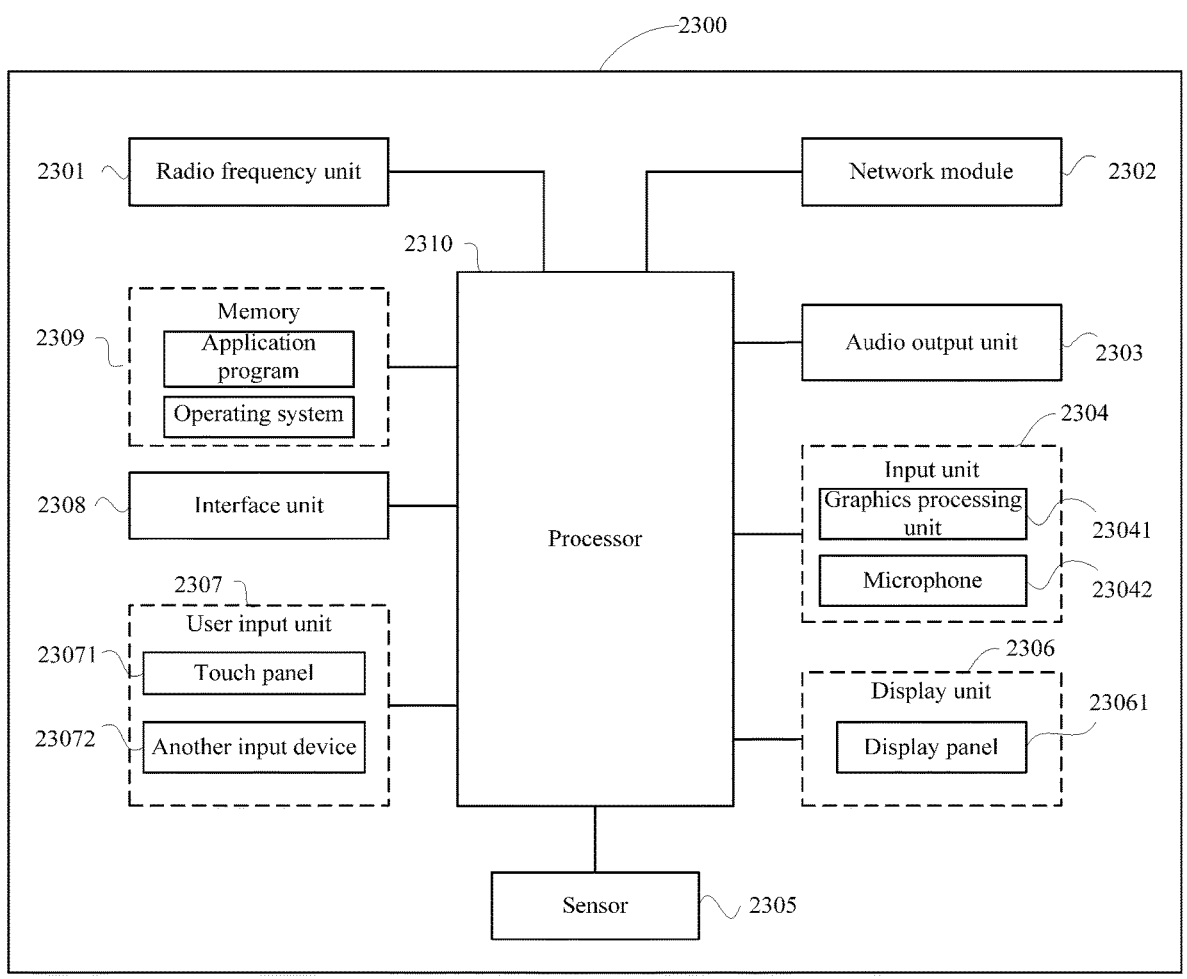
FIG. 23 is a second schematic structural diagram of an electronic device according to an embodiment of this application.

FIG. 23 is a schematic diagram of a hardware structure of an electronic device for implementing embodiments of this application.

The electronic device 2300 includes but is not limited to components such as a radio frequency unit 2301, a network module 2302, an audio output unit 2303, an input unit 2304, a sensor 2305, a display unit 2306, a user input unit 2307, an interface unit 2308, a memory 2309, and a processor 2310.

It may be understood by a person skilled in the art that the electronic device 2300 may further include a power supply (such as a battery) that supplies power to each component. The power supply may be logically connected to the processor 2310 by using a power management system, to implement functions such as charging, discharging, and power consumption management by using the power management system. A structure of the electronic device shown in FIG. 23 does not constitute a limitation on the electronic device, and may include more or fewer parts than those shown in the figure, or combine some components, or have different part arrangements. Details are not described herein again.

The processor 2310 is configured to: receive a first input by a user; in response to the first input, display a first target control; where the first target control contains an identifier of an application program that runs in the background; receive a second input by the user into a first application program that runs in the foreground; in response to the second input, display a thumbnail of a first interface of the first application program, where the first interface of the first application program is an interface when the first application program runs in the foreground; receive a third input by the user into the thumbnail of the first interface of the first application program; in response to the third input, switch the first application program to run in the background, and display an identifier of the first application program in the first target control.

In some embodiments, the processor 2310 is further configured to: in a case that the first target control is not displayed and a second application program receives a message, display the first target control, an identifier of the second application program, and the message received by the second application program, where the first target control contains the identifier of the second application program; receive a fourth input by the user into the message of the second application program; and in response to the fourth input, display an information input control used for replying to the message received by the second application.

In some embodiments, the processor 2310 is further configured to: receive a fifth input by the user into the first target control; and in response to the fifth input, hide the first target control.

In some embodiments, the processor 2310 is further configured to: receive a sixth input by the user into an identification of a third application program in the first target control; and in response to the sixth input, switch the third application program to run in the foreground.

In some embodiments, the processor 2310 is further configured to: receive a seventh input by the user into an identification of a fourth application program in the first target control; and in response to the seventh input, close the fourth application program.

In some embodiments, the processor 2310 is further configured to: receive an eighth input by the user into an identifier of a fifth application program that does not run; and in response to the eighth input, preload a resource for the fifth application program, where the fifth application program runs in the background, and display the identifier of the fifth application program in the first target control.

In some embodiments, the processor 2310 is further configured to: receive a ninth input by the user into the first target control; and in response to the ninth input, display in sequence the identifiers of the application programs that run in the background and that are contained in the first target control.

In some embodiments, the processor 2310 is further configured when the first target control is a half disk, and the identifier of the application program that runs in the background is distributed on the half disk.

In some embodiments, the processor 2310 is further configured to: receive a tenth input by a user; and in response to the tenth input, display a second target control, where the second target control contains an identifier of a sixth application program, and the sixth application program is an application program that is used more frequently than a first threshold or ranked higher than a second threshold in terms of a frequency of being used within a preset time period.

It should be noted that the electronic device 2300 in this embodiment can implement each process in the method embodiments in the embodiments of this application, with the same beneficial effects achieved. To avoid repetition, details are not described herein again.

An embodiment of this application further provides a readable storage medium. The readable storage medium stores a program or an instruction. When the program or the instruction is executed by a processor, the processes in the foregoing method embodiments for running an application program are implemented, with the same beneficial effects achieved. To avoid repetition, details are not described herein again.

The processor is a processor in the electronic device in the foregoing embodiment. The readable storage medium includes a computer-readable storage medium, such as a computer Read-only Memory (ROM), a Random Access Memory (RAM), a magnetic disk, or an optical disc.

An embodiment of this application further provides a chip. The chip includes a processor and a communications interface, and the communications interface is coupled to the processor. The processor is configured to run a program or an instruction, to implement various processes of the foregoing method embodiments for running an application program, with the same technical effects achieved. To avoid repetition, details are not described herein again.

It should be understood that the chip mentioned in this embodiment of this application may also be referred to as a system-level chip, a system chip, a chip system, or a system on a chip.

It should be noted that, in this specification, the terms "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. A method for running an application program, comprising:
   receiving a first input by a user when a display screen of an electronic device displays a first interface of a first application program that runs in foreground;
   in response to the first input, displaying a first target control, wherein the first target control contains an identifier of an application program that runs in background;
   while displaying the first target control, receiving a second input by the user into the first application program that runs in the foreground, wherein the second input is a tab upward swiping operation initiated from the bottom of the display screen of the electronic device;
   in response to the second input, displaying a thumbnail of the first interface of the first application program that runs in the foreground;
   receiving a third input by the user into the thumbnail of the first interface of the first application program that runs in the foreground, wherein the third input is an operation that drags the thumbnail and moves the thumbnail to a position of the first target control; and
   in response to the third input, switching the first application program to run in the background and displaying an identifier of the first application program in the first target control.

2. The method according to claim 1, wherein before receiving the first input by the user, the method further comprises:
   when the first target control is not displayed and a second application program receives a message, displaying the first target control, an identifier of the second application program, and the message received by the second application program, wherein the first target control contains the identifier of the second application program;
   receiving a fourth input by the user into the message received by the second application program; and
   in response to the fourth input, displaying an information input control used for replying to the message received by the second application program.

3. The method according to claim 1, wherein after displaying the first target control in response to the first input, the method further comprises:
   receiving an eighth input by the user into an identifier of a fifth application program that does not run; and
   in response to the eighth input, preloading a resource for the fifth application program, wherein the fifth application program runs in the background, and displaying the identifier of the fifth application program in the first target control.

4. The method according to claim 1, further comprising:
   receiving a tenth input by a user; and
   in response to the tenth input, displaying a second target control, wherein the second target control contains an identifier of a sixth application program, and the sixth application program is an application program that is used more frequently than a first threshold or ranked higher than a second threshold in terms of a frequency of being used within a preset time period.

5. An electronic device, comprising:
a memory storing a computer program; and
a processor coupled to the memory and configured to execute the computer program to perform operations comprising:
   receiving a first input by a user when a display screen of an electronic device displays a first interface of a first application program that runs in foreground;
   in response to the first input, displaying a first target control, wherein the first target control contains an identifier of an application program that runs in background;
   while displaying the first target control, receiving a second input by the user into the first application program that runs in the foreground, wherein the second input is a tab upward swiping operation initiated from the bottom of the display screen of the electronic device;

in response to the second input, displaying a thumbnail of the first interface of the first application program that runs in the foreground;

receiving a third input by the user into the thumbnail of the first interface of the first application program that runs in the foreground, wherein the third input is an operation that drags the thumbnail and moves the thumbnail to a position of the first target control; and in response to the third input, switching the first application program to run in the background and displaying an identifier of the first application program in the first target control.

6. The electronic device according to claim 5, wherein before receiving the first input by the user, the operations further comprise:

when the first target control is not displayed and a second application program receives a message, displaying the first target control, an identifier of the second application program, and the message received by the second application program, wherein the first target control contains the identifier of the second application program;

receiving a fourth input by the user into the message received by the second application program; and in response to the fourth input, displaying an information input control used for replying to the message received by the second application program.

7. The electronic device according to claim 5, wherein after displaying the first target control in response to the first input, the operations further comprise:

receiving an eighth input by the user into an identifier of a fifth application program that does not run; and in response to the eighth input, preloading a resource for the fifth application program, wherein the fifth application program runs in the background, and displaying the identifier of the fifth application program in the first target control.

8. The electronic device according to claim 5, wherein the operations further comprise:

receiving a tenth input by a user; and in response to the tenth input, displaying a second target control, wherein the second target control contains an identifier of a sixth application program, and the sixth application program is an application program that is used more frequently than a first threshold or ranked higher than a second threshold in terms of a frequency of being used within a preset time period.

9. A non-transitory computer-readable storage medium, storing a computer program, when the computer program is executed by a processor, causes the processor to perform operations comprising:

receiving a first input by a user when a display screen of an electronic device displays a first interface of a first application program that runs in foreground;

in response to the first input, displaying a first target control, wherein the first target control contains an identifier of an application program that runs in background;

while displaying the first target control, receiving a second input by the user into the first application program that runs in the foreground, wherein the second input is a tab upward swiping operation initiated from the bottom of the display screen of the electronic device;

in response to the second input, displaying a thumbnail of the first interface of the first application program that runs in the foreground;

receiving a third input by the user into the thumbnail of the first interface of the first application program that runs in the foreground, wherein the third input is an operation that drags the thumbnail and moves the thumbnail to a position of the first target control; and in response to the third input, switching the first application program to run in the background and displaying an identifier of the first application program in the first target control.

10. The non-transitory computer-readable storage medium according to claim 9, wherein before receiving the first input by the user, the operations further comprise:

when the first target control is not displayed and a second application program receives a message, displaying the first target control, an identifier of the second application program, and the message received by the second application program, wherein the first target control contains the identifier of the second application program;

receiving a fourth input by the user into the message received by the second application program; and in response to the fourth input, displaying an information input control used for replying to the message received by the second application program.

11. The non-transitory computer-readable storage medium according to claim 9, wherein after displaying the first target control in response to the first input, the operations further comprise:

receiving an eighth input by the user into an identifier of a fifth application program that does not run; and in response to the eighth input, preloading a resource for the fifth application program, wherein the fifth application program runs in the background, and displaying the identifier of the fifth application program in the first target control.

12. The non-transitory computer-readable storage medium according to claim 9, wherein the operations further comprise:

receiving a tenth input by a user, and in response to the tenth input, displaying a second target control, wherein the second target control contains an identifier of a sixth application program, and the sixth application program is an application program that is used more frequently than a first threshold or ranked higher than a second threshold in terms of a frequency of being used within a preset time period.

* * * * *